United States Patent
Ohtsubo et al.

(10) Patent No.: US 8,444,203 B2
(45) Date of Patent: May 21, 2013

(54) DRIVING POSITION ADJUSTING APPARATUS FOR VEHICLE

(75) Inventors: Tomonori Ohtsubo, Hiroshima (JP); Toshihiko Tomita, Hiroshima (JP); Isao Hirashima, Hiroshima (JP); Shingo Kunihiro, Hiroshima (JP); Asami Iwamoto, Hiroshima (JP); Hirotake Matsuki, Hiroshima (JP)

(73) Assignee: Mazda Motor Corporation (JP)

( * ) Notice: Subject to any disclaimer, the term of this patent is extended or adjusted under 35 U.S.C. 154(b) by 201 days.

(21) Appl. No.: 12/871,411

(22) Filed: Aug. 30, 2010

(65) Prior Publication Data

US 2011/0068608 A1  Mar. 24, 2011

(30) Foreign Application Priority Data

| Sep. 18, 2009 | (JP) | 2009-217686 |
| Sep. 18, 2009 | (JP) | 2009-217687 |
| Sep. 18, 2009 | (JP) | 2009-217688 |
| Sep. 18, 2009 | (JP) | 2009-217689 |
| Sep. 29, 2009 | (JP) | 2009-225435 |

(51) Int. Cl.
  *B60N 3/06* (2006.01)
(52) U.S. Cl.
  USPC ............................................... 296/75
(58) Field of Classification Search
  USPC ............................................... 296/75
  See application file for complete search history.

(56) References Cited

U.S. PATENT DOCUMENTS

| 4,392,546 | A  * | 7/1983  | Brown et al. | 180/326 |
| 6,283,529 | B2 * | 9/2001  | Kitagawa | 296/75 |
| 6,312,039 | B1 * | 11/2001 | Bartz | 296/75 |
| 6,450,530 | B1 * | 9/2002  | Frasher et al. | 280/735 |
| 6,761,389 | B2 * | 7/2004  | Honda et al. | 296/75 |
| 7,695,045 | B2 * | 4/2010  | Takeda et al. | 296/75 |
| 7,946,641 | B2 * | 5/2011  | Ohtsubo et al. | 296/75 |

FOREIGN PATENT DOCUMENTS

| DE | 738012 C | 7/1943 |
| EP | 1 623 865 A2 | 2/2006 |
| EP | 1 974 992 A1 | 10/2008 |
| JP | 2009-083781 A | 4/2009 |
| WO | 2006/043737 A1 | 4/2006 |

OTHER PUBLICATIONS

The Extended European Search Report dated Jan. 26, 2011; Application No. 10008848.3-1254.

* cited by examiner

*Primary Examiner* — Joseph Pape
(74) *Attorney, Agent, or Firm* — Studebaker & Brackett PC; Donald R. Studebaker

(57) ABSTRACT

A driving position adjusting apparatus for a vehicle comprises a driver's seat provided on a floor panel of a vehicle compartment, an operational pedal, such as an accelerator pedal, which is operated by a driver seated in the driver's seat, an incline-face portion which is provided on the floor panel, on which a heel of the driver operating the operational pedal is placed, the incline-face portion having an upper face which is inclined so that a front portion thereof is located at a higher position than a rear portion thereof, and a heel-placement height adjusting device which adjusts a height position of the driver's heel placed on the incline-face portion at least by moving up or down the incline-face portion.

6 Claims, 25 Drawing Sheets

DRIVING POSITION ADJUSTING APPARATUS FOR VEHICLE

BACKGROUND OF THE INVENTION

The present invention relates to a driving position adjusting apparatus for a vehicle which comprises a driver's seat provided on a floor panel of a vehicle compartment and an operational pedal operated by a driver seated in the driver's seat.

Conventionally, as shown in Japanese Patent Laid-Open Publication No. 2009-83781, for example, a driving position adjusting apparatus, which comprises a seat position adjusting device to longitudinally move a seat cushion of a driver's seat and a floor moving mechanism to move up or down a movable floor portion on which a heel of a driver who is seated in the driver's seat and operates an operational pedal is placed, wherein the movable floor portion is moved up according to a forward move of the seat cushion, is known. In this apparatus, there are provided a pull cable to transmit a drive force of moving forward the seat cushion with the seat position adjusting mechanism as a pull force and a winding-up mechanism to wind up the pull cable. A base end of the pull cable wound up by the winding-up mechanism is provided to extend forwardly of a vehicle body and connected to the seat cushion, whereas a tip of the pull cable is connected to a moving portion of the floor moving mechanism.

According to the above-described driving position adjusting apparatus disclosed in the publication, in case the driver's seat is moved forwardly of the vehicle body with the seat position adjusting mechanism when the driver is changed from a tall driver to a short driver, such as a women, for example, the drive force is transmitted to the moving portion of floor moving mechanism via the pull cable, and thereby the movable floor portion is pulled up by the floor moving mechanism. Accordingly, the above-described driving position adjusting apparatus has an advantage in that the height position of the above-described movable floor portion can be automatically adjusted so that even the short driver, who has a relatively short sole compared to the tall driver, can operate (press) the operational pedal properly with a driver's foot.

However, in case, as disclosed in the above-described publication, there are provided a cross member to support a front end portion of the driver's seat and a floor support member to support the movable floor portion on a floor bottom portion which is partitioned by a kick-up portion formed at a front end portion of a vehicle floor, and a portion of the driver's seat at the driver's foot is configured to move up over a substantially entire area by sliding a slide axis of the movable floor portion along a guide groove which is formed at the floor support portion, there is a problem in that the size of the above-described movable floor portion and its moving mechanism would become improperly large and their structures would be so complex, which may cause an increase of the vehicle weight and manufacturing costs.

SUMMARY OF THE INVENTION

The present invention has been devised in view of the above-described problem, and an object of the present invention is to provide a driving position adjusting apparatus for a vehicle which enables the driver seated in the driver's seat to properly operate the operational pedal by adjusting the driving position properly with a simple structure.

According to the present invention, there is provided a driving position adjusting apparatus for a vehicle, comprising a driver's seat provided on a floor panel of a vehicle compartment, an operational pedal operated by a driver seated in the driver's seat, an incline-face portion provided on the floor panel, on which a heel of the driver operating the operational pedal is placed, the incline-face portion having an upper face which is inclined so that a front portion thereof is located at a higher position than a rear portion thereof, and a heel-placement height adjusting device to adjust a height position of the driver's heel placed on the incline-face portion at least by moving up or down the incline-face portion.

According to the present invention, a moving range of the incline-face portion can be restrained from being improperly large, and a knee's angle and a sole's inline angle of the driver can be kept in proper ranges regardless of the body size of the driver (i.e., for the short driver having a relatively short sole and the tall driver having a relatively long sole), so that an appropriate pedal operation can be obtained having the driver's heel properly placed on the incline-face portion.

According to an embodiment of the present invention, the heel-placement height adjusting device comprises a movable floor portion which is supported on the floor panel so as to move up or down and a drive portion which drives the movable floor portion for moving up or down of the movable floor portion, and the incline-face portion is arranged on an upper face of the movable floor portion of the heel-placement height adjusting device. Thereby, the height position of the driver's heel placement can be adjusted with the simple structure by moving up or down the movable floor portion, so that the appropriate pedal operation can be obtained having the driver's heel properly placed on the incline-face portion regardless of the driver's body size.

According to another embodiment of the present invention, a longitudinal length and a longitudinal position of the movable floor portion is set based on a foremost position and a rearmost position of the driver's heel which is changeable depending on a body size and a sitting position of the driver seated in the driver's seat. Thereby, it can be prevented that the size of the movable floor portion and the drive portion becomes improperly large which may be caused by the large moving range of the incline-face portion, ensuring the above-described advantages of the adjustment of the height position of the driver's heel placement. Accordingly, the structure can be made simple effectively.

According to another embodiment of the present invention, the operational pedal is an accelerator pedal to control a vehicle traveling drive source. Thereby, the accelerator pedal which may require a delicate operation in a state of having the driver's heel properly placed on the incline-face portion can be operated properly with the simple structure.

According to another embodiment of the present invention, the operational pedal comprises a movable pedal member which is operated by the driver and a pedal base member which is fixed to the floor panel, a lower end portion of the movable pedal member being pivotally supported at the pedal base member. Thereby, the proper pedal operation can be obtained with the simple structure.

According to another embodiment of the present invention, the heel-placement height adjusting device and the operational pedal are assembled to a vehicle body as a unit. Thereby, assembling of the heel-placement height adjusting device and the operational pedal can be easier.

According to another embodiment of the present invention, the operational pedal comprises a movable pedal member which is operated by the driver and a pedal base member which is fixed to the floor panel, and the pedal base member and the heel-placement height adjusting device are formed as a unit. Thereby, assembling of the operational pedal and the heel-placement height adjusting device can be easier.

According to another embodiment of the present invention, the heel-placement height adjusting device comprises a movable floor portion which is supported on the floor panel so as to move up or down and a drive portion which drives the movable floor portion for moving up or down of the movable floor portion, and the movable floor portion and the operational pedal are formed as a unit. Thereby, assembling of the movable floor portion and the operational pedal can be easier.

According to another embodiment of the present invention, at the heel-placement height adjusting device is provided a support base which supports the movable floor portion so that the movable floor portion moves up or down, and the pedal base member of the operational pedal is attached to the support base as a unit. Thereby, assembling of the movable floor portion and the heel-placement height adjusting device to the vehicle body can be easy and proper.

According to another embodiment of the present invention, the driving position adjusting apparatus further comprises a footrest provided beside the operational pedal, on which a foot of the driver is rested, and a footrest adjusting device to adjust a rest state of the driver's hoot by the footrest according to an adjustment of the heel-placement height adjusting device. Thereby, since the rest state of the driver's hoot rested on the footrest for not operating the operational pedal is adjusted according to the adjustment of the heel-placement height adjusting device, an imbalance in a foot angle and the like between the foot operating the pedal and the foot not operating the operational pedal can be restrained, so that the driver can be prevented from having uncomfortable feelings.

According to another embodiment of the present invention, the footrest adjusting device adjusts a height position of the driver's heel rested on the footrest. Thereby, the height position of the heel placement of the driver's foot rested on the footrest for not operating the operational pedal can be adjusted, so that the imbalance in the foot angle and the like between the foot operating the pedal and the foot not operating the operational pedal can be restrained.

According to another embodiment of the present invention, the footrest adjusting device adjusts an arrangement angle of the footrest. Thereby, the sole angle of the driver's foot which is placed on the footrest for not operating the operational pedal can be adjusted, so that the imbalance in the foot angle between the foot operating the pedal and the foot not operating the operational pedal can be restrained.

According to another embodiment of the present invention, the heel-placement height adjusting device comprises a movable floor portion which is supported on the floor panel so as to move up or down and a drive portion which drives the movable floor portion for moving up or down of the movable floor portion, and the footrest adjusting device is comprised of part of said movable floor portion and drive portion of the heel-placement height adjusting device. Thereby, the adjustment of the heel placement of the driver's foot and the adjustment of the position of the driver's foot not operating the operational pedal can be conducted concurrently.

According to another embodiment of the present invention the heel-placement height adjusting device comprises a movable floor portion which is supported on the floor panel so as to move up or down and a drive portion which drives the movable floor portion for moving up or down of the movable floor portion, and the footrest adjusting device is arranged on the floor panel separately from the heel-placement height adjusting device. Thereby, the size of the movable floor portion of the heel-placement height adjusting device can be prevented from becoming improperly large, so that the structure can be properly compact.

Other features, aspects, and advantages of the present invention will become apparent from the following description which refers to the accompanying drawings.

DETAILED DESCRIPTION OF THE INVENTION

Figure 1:
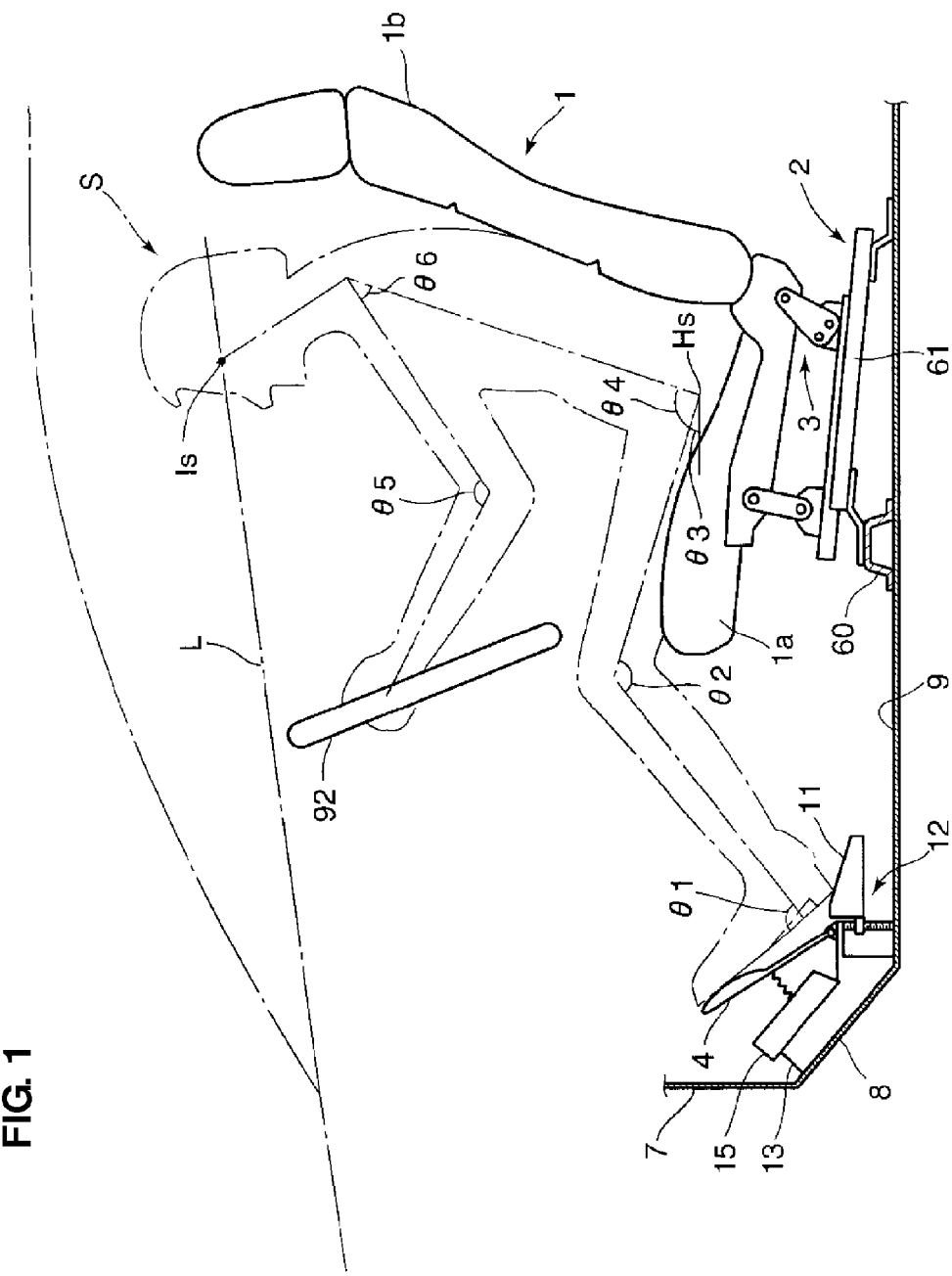
FIG. 1 is an explanatory diagram showing a first embodiment of a driving position adjusting apparatus for a vehicle according to the present invention.

Hereinafter, preferred embodiments of the present invention will be described referring to the accompanying drawings.

Embodiment 1

FIGS. 1-4 show a first embodiment of a driving position adjusting apparatus for a vehicle according to the present invention. This vehicle is equipped with a seat adjusting mechanism which comprises a longitudinal-position adjusting mechanism 2 which adjusts a longitudinal position of a seat cushion 1a of a driver's seat 1 provided in a vehicle compartment by making the seat cushion 1a slide longitudinally, and an inclination-angle adjusting mechanism 3 which adjusts an inclination-angle of the seat cushion 1a. Further, in front of the driver's seat are arranged an accelerator pedal 4 which is a so-called organ type of pedal having its lower end portion pivotally supported and operated (pressed down) by a driver to control a traveling drive source of the vehicle, such as an engine or motor, and a brake pedal 5 and a clutch pedal 6 which are a so-called hanging type of pedal having its upper end portion pivotally supported.

At a front portion of the vehicle compartment are provided a dash panel 7 which partitions the vehicle compartment from an engine room, a kick-up panel 8 which extends downwardly and rearwardly from a lower end of the dash panel 7 in an inclined state, and a floor panel 9 which extends rearwardly substantially horizontally from a rear end of the kick-up panel 8. A well-known floor mat 10, which comprises a back reinforcing material which is mainly made of material having functions of vibration proof, sound insulation, heat insulation and so on, such as melt sheet, felt, or glass wool, and a layer material which covers over an upper face of the reinforcing material and is made of pile material, is arranged on an upper face of the floor panel 9.

Herein, an incline-face portion 11 is provided on the floor panel 9 on which a heel of the driver operating the accelerator pedal 4 is placed. This incline-face portion 11 has an upper face which is inclined by an inclination angle α which is within a range of 13.5-23.5 degrees, for example, 20 degrees, relative to a horizontal line so that a front portion thereof is located at a higher position than a rear portion thereof. Further, a heel-placement height adjusting device 12 is provided, which adjusts a height position of the driver's heel placed on the incline-face portion 11 at least by moving up or down the incline-face portion 11.

The accelerator pedal 4 comprises a pedal base member 15 which is fixed to a support base 13, which will be described below, which constitutes part of the heel-placement height adjusting device 12, a movable pedal member 17 which is supported at the pedal base member 15 so as to swing around a lower-end hinge portion 16 according to a pressing operation of the driver, a biasing member 18 which is comprised of a compressive coil spring or the like to bias the movable pedal member 17 rearwardly of the vehicle body, and an accelerator-pedal operation detecting portion which detects a swinging displacement of the movable pedal member 17 and outputs its detection signal to a controller, not illustrated.

The movable pedal member 17 of the accelerator pedal 4, which is made of a synthetic-resin plate member or the like, includes at its upper portion a pressing portion 20 which has a convex face which projects rearwardly of the vehicle body having a specified curvature. The movable pedal member 17 is pressed down by the driver so as to swing around the lower end hinge 16 in a sate in which a ball of an operational foot of the driver contacts the above-described pressing portion 20.

On the back face of the movable pedal member 17 are provided a projection portion 22 which restricts a forward move of the movable pedal member 17 by contacting a stopper portion 21 provided at the upper face of a front upper portion of the base member 15, an upper-end support portion 23 which supports an upper end portion of the biasing member 18, a restriction portion 25 which restricts a rearward move of the movable pedal member 17 by engaging with an engaging hook portion 24 provided at the upper face of a middle portion of the base member 15, and a pivotal portion 27 of an operational rod 26 which constitutes the above-described accelerator-pedal operation detecting portion.

The base member 15 of the accelerator pedal 4 has a fixing base plate 28 which is fixed to the support base 13 of the heel-placement height adjusting device 12 with bolts. Onto the upper face of the fixing base plate 28 are provided a storage portion 30 of a control box 29 in which a linear sensor as an accelerator-pedal operation detecting portion is stored, a lower-end support portion 31 which supports a lower end portion of the biasing member 18, and a guide portion 33 which supports a connection member 32, which is made of a flexible line-shaped member or the like and coupled to the lower end of the above-described operational rod 26, so that the connection member 32 can slide.

A coupler 34 which connects a harness, not illustrated, to the control box 29 is attached to a front face of the storage portion 30 of the control box 29, and the above-described stopper portion 21 which the projection portion 22 of the movable pedal member 17 contacts is formed at the upper face of the storage portion 30 so as to project upwardly. Further, the above-described engaging hook portion 24 with which the restriction portion 25 of the movable pedal member 17 engages is formed in front of the guide portion 33, and a support bracket 35 which supports the lower end hinge portion 16 of the movable pedal member 17 is formed at a rear end portion of the fixing base plate 28.

Figure 3:
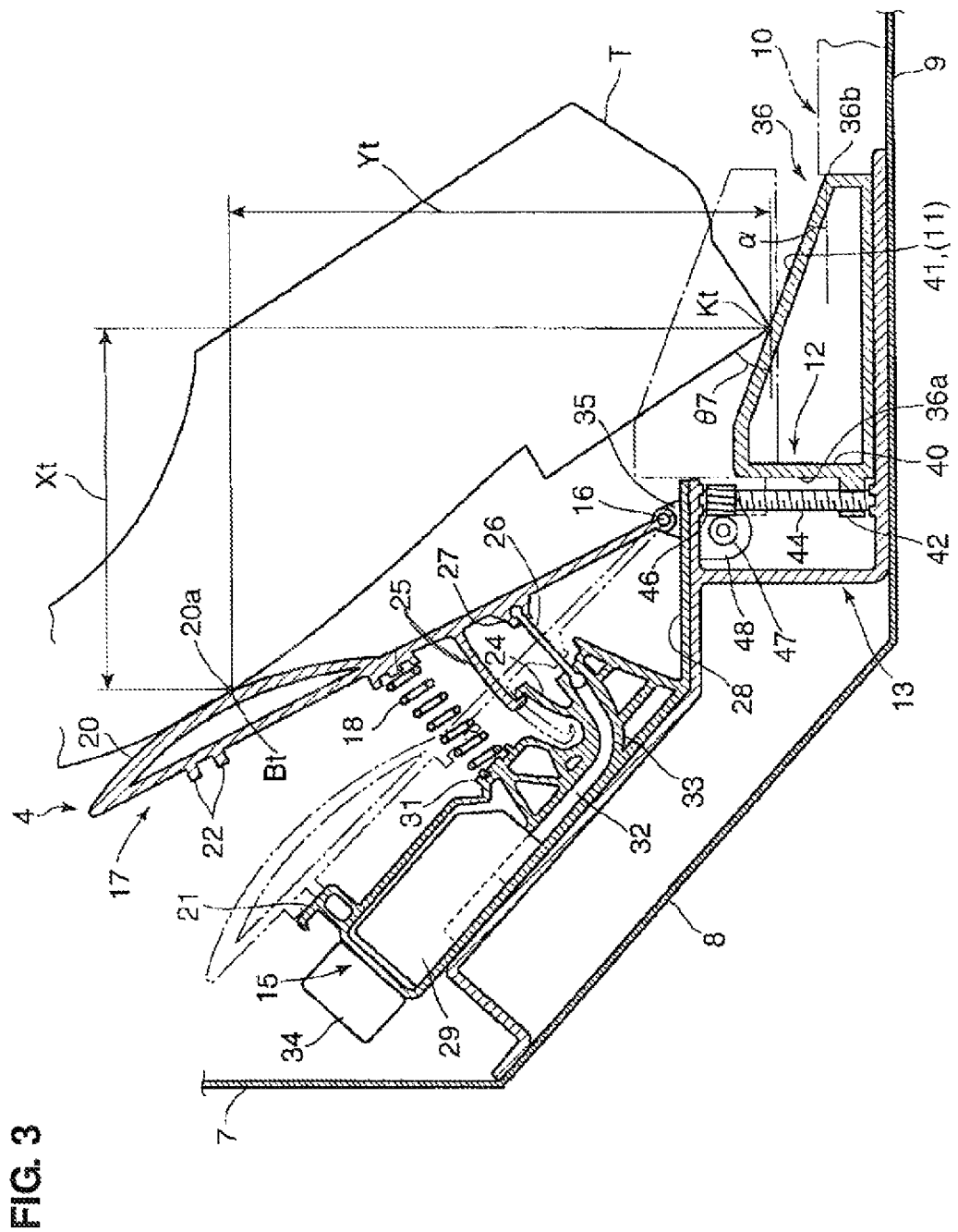
FIG. 3 is a sectional view taken along line III-III of FIG. 2.

The movable pedal member 17 of the accelerator pedal 4 is supported at the support bracket 35 of the pedal base member 15 via a pivotal axis of the lower end hinge portion 16 so that it can be held in its inclined non-operational position by a biasing force of the biasing member 18 in a normal state. When a tall driver T with the a heel Kt of the driver's foot placed on the incline-face portion 11 presses the movable pedal member 17 in a state in which the ball Bt of the driver's hoot contacts the pressing portion 20 of the movable pedal member 17, the movable pedal member 17 is driven to rotate downwardly around the lower end hinge portion 16 against the biasing force of the biasing member 18 as shown in FIG. 3. This drive force of the movable pedal member 17 is transmitted to the liner sensor of the control box 29 via the operational rod 26 and the connection member 32. Thereby, an operational amount of the movable pedal portion 17 is detected, and then its detection signal is outputted from the control box 29 to an engine control unit and the like via the coupler 34 and the harness, not illustrated.

Figure 4:
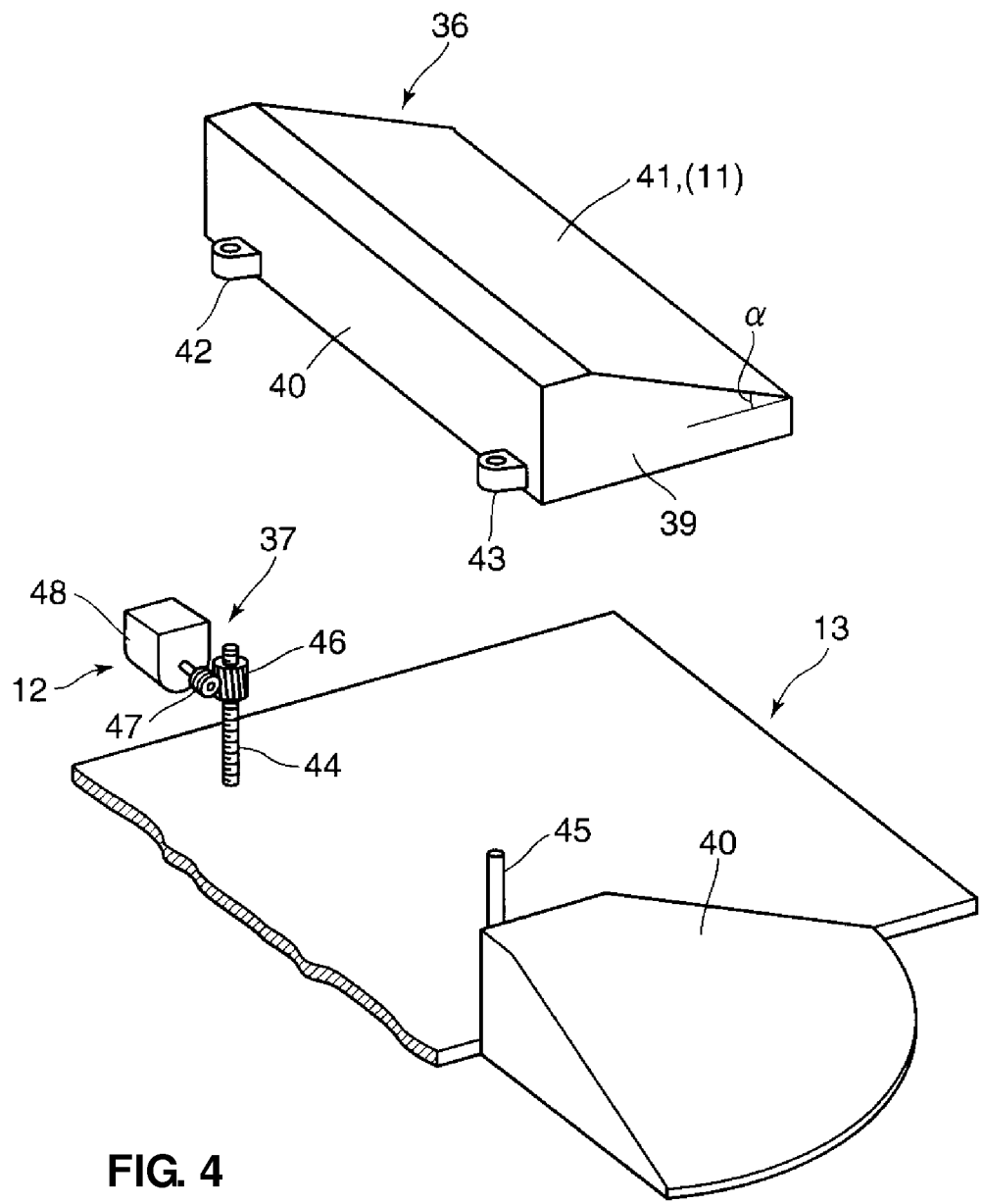
FIG. 4 is an exploded perspective view showing the specific structure of the heel-placement height adjusting device.

The heel-placement height adjusting device 12 comprises, as shown in FIG. 4, the support base 13 which is fixed onto the floor panel 9 in front of the driver's seat 1, a movable floor portion 36 which is supported at the support base 13 so as to move up or down, and a drive portion 37 which drives the movable floor portion 36. Further, a fan-shaped portion 38 is formed at a left-side portion of the support base 13. This fan-shaped portion 38 has a one fourth corn shape as shown in FIG. 4.

The movable floor portion 36 comprises a pair of side plates 39 which has a trapezoidal shape in a side view, a front-face plate 40 which covers front face portions of the side plates 39, and an upper-face plate 41 which connects upper face portions of the side plates 39. The upper-face place 41 forms the above-described incline-face portion 11.

Further, a screw shaft 44 is supported at the support base 13 so as to rotate, and a guide bar 45 is provided at the support base 13 so as to project upwardly. The screw shaft 44 is inserted into a screw hole which is formed at one (i.e., a projection 42) of projections 42, 43 which are formed at both-side portions of the front-face plate 40, whereas the guide bar 45 is inserted into a through hole which is formed at the other projection (i.e., the projection 43).

The above-described drive portion 37 comprises a worm wheel 46 which is fixed to the screw shaft 44 and a drive motor 48 which is equipped with a worm gear 47 for driving the worm wheel 46 at its output shaft. Herein, when the driver seated in the driver's seat 1 adjusts the longitudinal position of the driver's seat 1 depending on the driver's body size, the drive motor 48 is driven according to the operation of the above-described seat position adjusting mechanism, so that the worm wheel 46 and the screw shaft 44 are rotated, thereby the movable floor portion 36 is moved up from its lower position shown in FIG. 3 to its upper position shown in FIG. 5.

The longitudinal length of the heel-placement height adjusting device 12 from the front end position 36a to the rear end position 36b is set based on a foremost position and a rearmost position of the driver's heel which may move depending on the body size or the sitting position of the driver seated in the driver's seat 1. That is, the front end position 36a of the movable floor portion 36 is set based on the position of the heel of the short driver S, and the rear end position 36b of the movable floor portion 36 seated in the driver's seat 1 is set based on the position of the heel of the tall driver S seated in the driver's seat 1.

For example, in case the distance from the heel Ks to the ball Bs of the foot of the short driver S is 155 mm and the ball Bs is made contact a pressing center 20a of the accelerator pedal 4 with the sole angle θ7 set at about 52 degrees, the heel Ks of the short driver S will be positioned about 95 mm (nearly equal to 155 mm×cos 52°) rearwardly from the pressing center 20a. Accordingly, the front end position 36a of the movable floor portion 36 is set at a location which is about 65 mm rearwardly from the pressing center 20a, having a specified margin.

Figure 2:
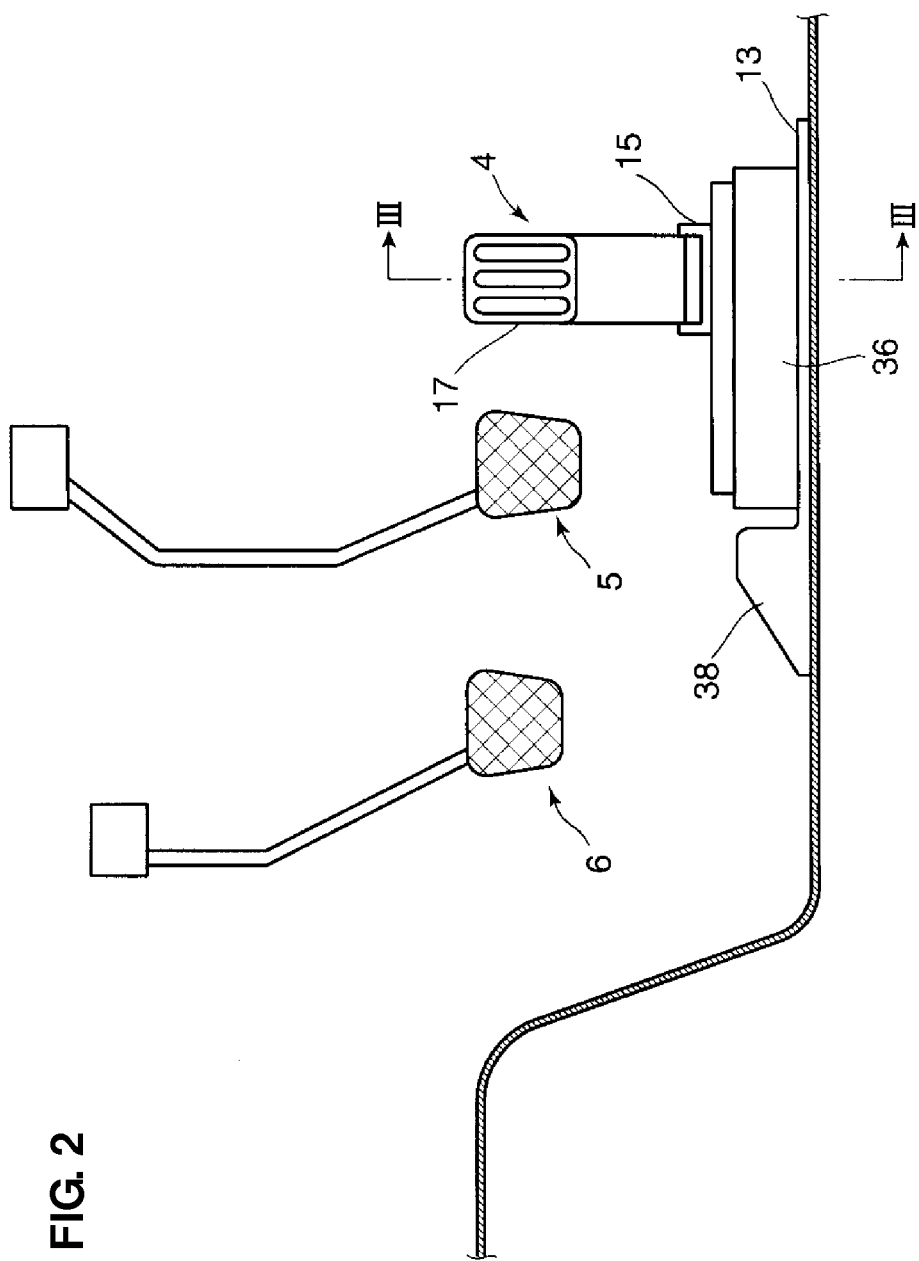
FIG. 2 is a rear view showing a specific structure of a heel-placement height adjusting device

Further, in case the distance from the heel Kt to the ball Bt of the foot of the tall driver T is 196 mm and the ball Bt is made contact the pressing center 20a of the accelerator pedal 4 with the sole angle θ7 set at about 52 degrees, the heel Kt of the tall driver T will be positioned about 121 mm (nearly equal to 196 mm×cos 52°) rearwardly from the pressing center 20a. Accordingly, the rear end position 36b of the movable floor portion 36 is set at a location which is about 155 mm rearwardly from the pressing center 20a, having a specified margin. Thus, in case the front end position 36a and rear end position 36b are set as described above, the longitudinal length of the movable floor portion 36 will be about 90 mm Herein, the both-side position and the width of the movable floor portion 36 is set properly based on the arrangement position of the accelerator pedal 4 and brake pedal 5 and the like so that the accelerator pedal 4 can be properly operated and also a smooth operation transmission from the operation of the accelerator pedal 4 to the operation of the brake pedal 5 can be obtained. For example, as shown in FIG. 2, the right end portion of the movable floor portion 36 which constitutes the incline-face portion 11 is positioned on the left side of and away from the right end portion of the accelerator pedal 4 by a specified distance, and the left end portion of the movable floor portion 36 is arranged at a position which corresponds to the left end portion of the brake pedal 5.

Herein, the heel-placement height adjusting device 12 which comprises the support base 13, movable floor portion 36, drive portion 37 and others and the pedal base member 15 of the accelerator pedal 4 which comprises the members 15, 17 and others may be attached to the vehicle body as a unit, by sub-assembling these in advance.

Figure 6:
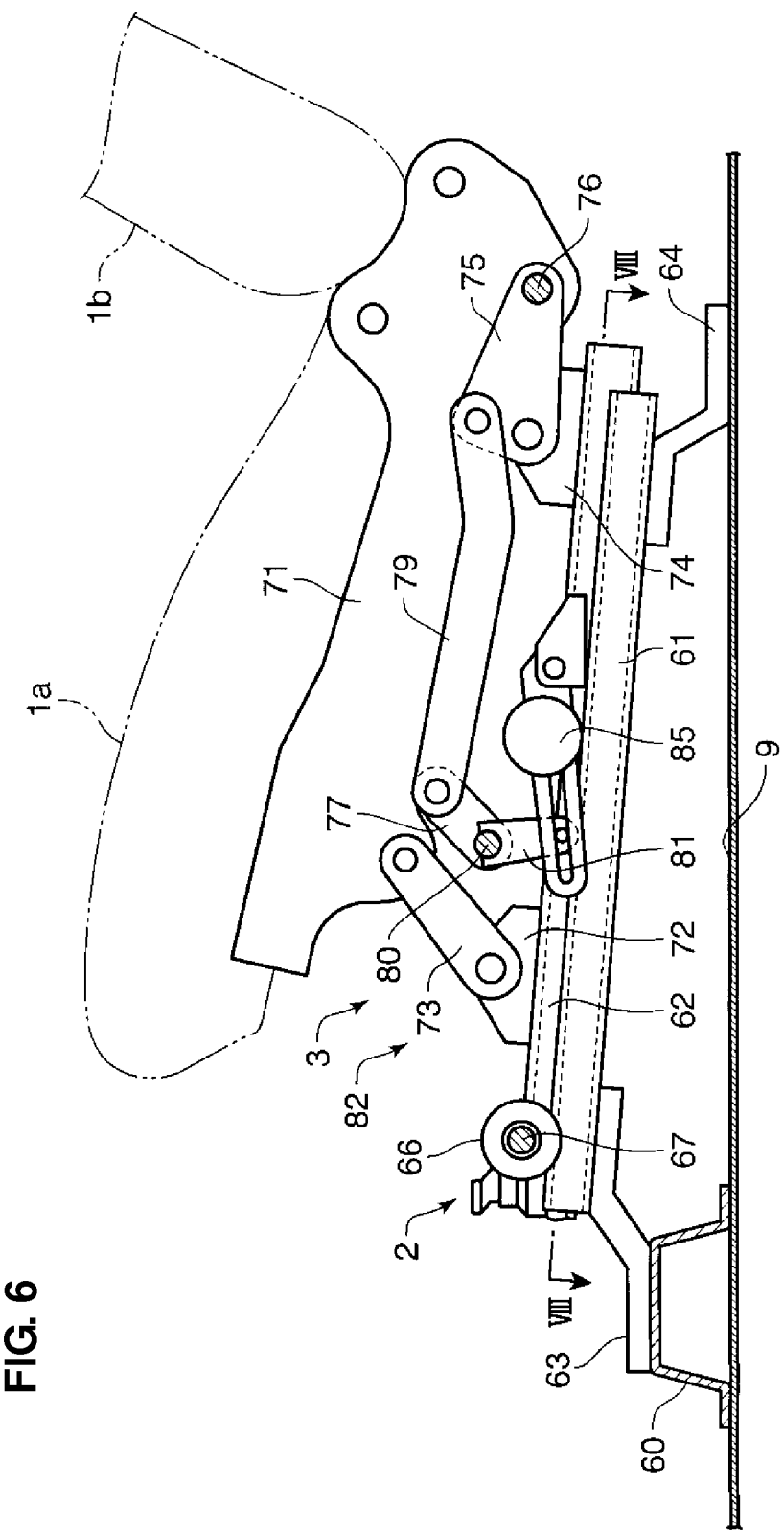
FIG. 6 is a side view showing a specific structure of a seat adjusting mechanism.
Figure 7:
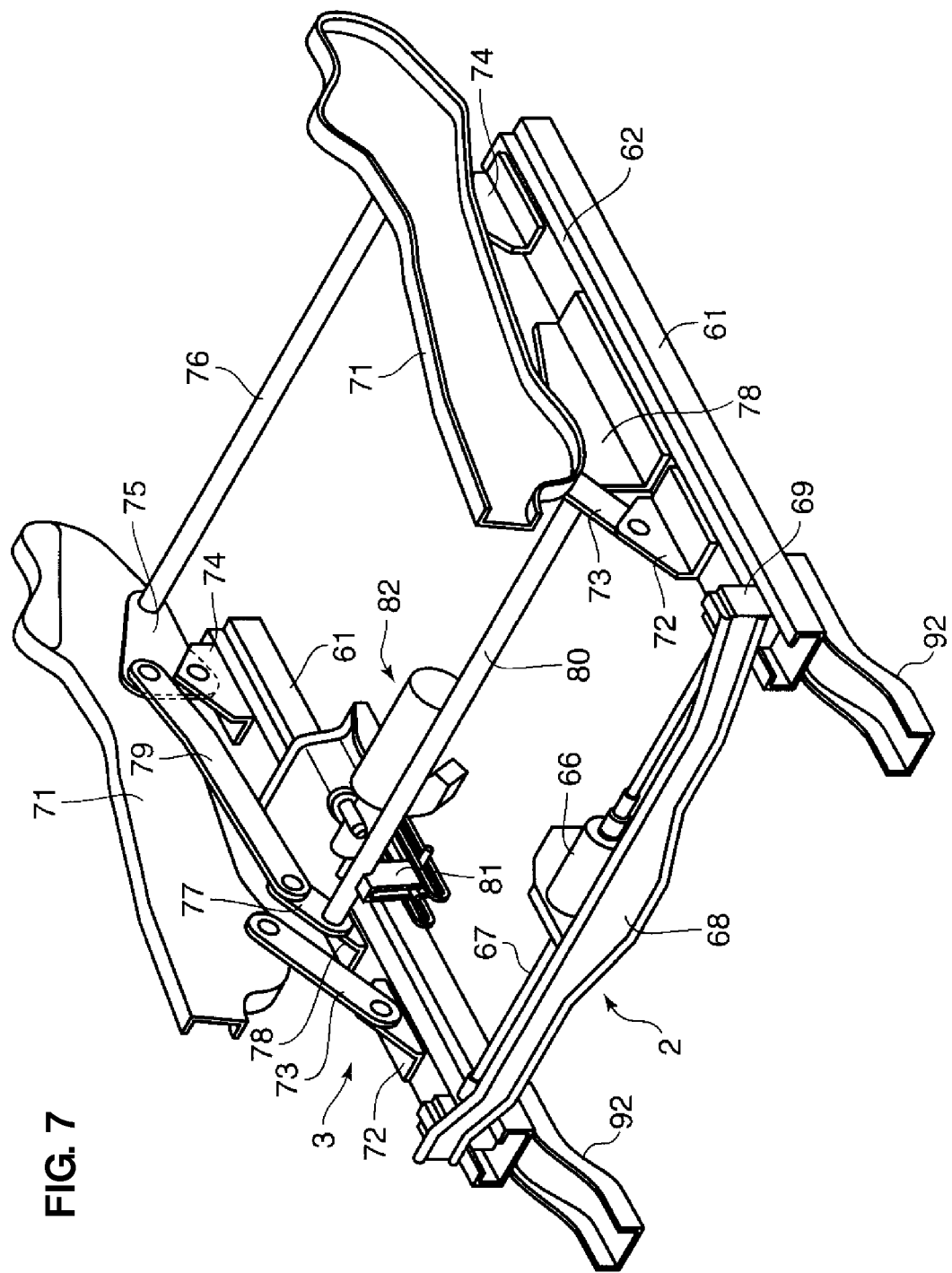
FIG. 7 is a perspective view showing the specific structure of the seat adjusting mechanism.
Figure 8:
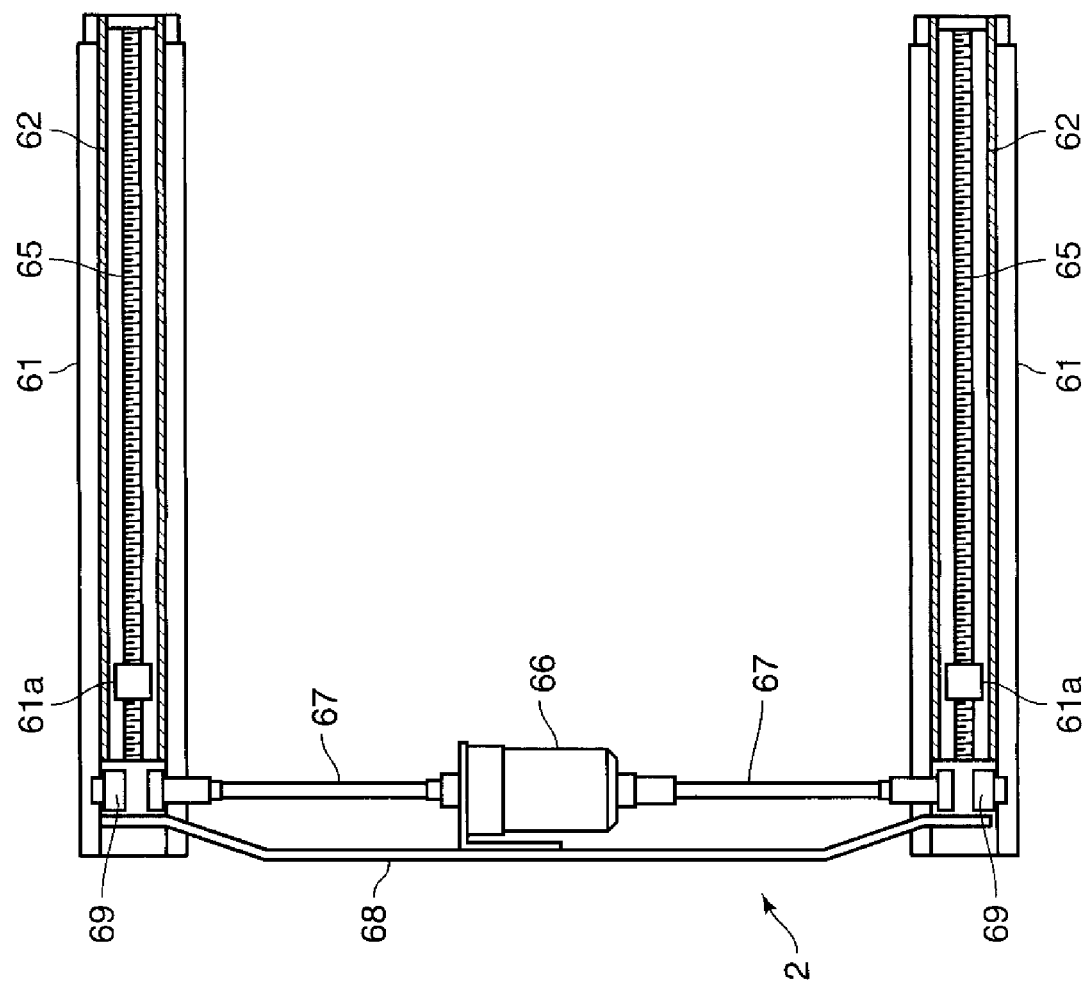
FIG. 8 is a sectional view taken along line VIII-VIII of FIG. 6.

As shown in FIGS. 6 through 8, a pair of seat-slide lower rails 61 which supports the seat cushion 1a so that the seat cushion 1a can move longitudinally is provided at the disposition portion of the driver's seat 1, and a pair of seat-slide upper rails 62 is provided so as to slide along the seat-slide lower rails 61. The seat-slide lower rails 61 is made of a C-type steel member or the like which has an opening on the top thereof, and attaching brackets 63, 64 are fixed to their both longitudinal ends by welding or the like. These brackets 63, 64 are fixed to an upper face of a cross member 60 and the like by fastening bolts or the like, so that the seat-slide lower rails 61 is disposed on the vehicle floor 9 in a inclined state in which the level of its front portion is slightly higher.

As shown in FIG. 8, a thread rotational shaft 65 is disposed inside each of the seat-slide lower rails 61, and a pair of drive shafts 67 which is rotated by a drive motor 66 and a support member 68 which supports the drive shafts 67 are provided respectively so as to extend in a vehicle width direction between both front ends of the seat-slide upper rails 62. At both-side end portions of the drive shafts 67 are provided drive-force transmitting portions 69 which transmit a drive force to the rotational shafts 65 via a mechanism which comprises bevel gears or worm gears.

The above-described seat-slide lower rails 61, seat-slide upper rails 62, rotational shaft 65, drive motor 66, drive shaft 67 and drive-force transmitting portion 69, and a pair of nut blocks 61a which is fixed to respective bottoms of the seat-slide lower rails 61 and engages with the respective rotational shaft 65 constitute the longitudinal-position adjusting mechanism 2.

For example, when a longitudinal adjusting switch, not illustrated, is operated for a forward moving, a control signal to rotate the drive motor 66 in its normal direction is outputted and the diver motor 66 is rotated in the normal direction by this control signal. Thereby, the drive force for moving the seat cushion 1a forwardly is transmitted to the drive shafts 67, drive-force transmitting portions 69, and rotational shafts 65. The rotational shafts 65 are rotated by the drive force inputted via the drive-force transmitting portions 69 in the state in which these shafts 65 are supported at the nut blocks 61a which are fixed to the bottom portions of the seat-slide lower rails 61, so that the rotational shafts 65 proceed forwardly. Consequently, the seat-slide upper rails 62 and thereby the seat cushion 1a of the driver's seat 1 are moved forwardly.

Meanwhile, when the longitudinal adjusting switch is operated for a rearward moving, a control signal to rotate the drive motor 66 in its reverse direction is outputted and the diver motor 66 is rotated in the reverse direction by this control signal. Thereby, the drive force for moving the seat cushion 1a rearwardly is transmitted to the drive shafts 67, drive-force transmitting portions 69, and rotational shafts 65. The rotational shafts 65 are rotated by the drive force, so that the rotational shafts 65 proceed rearwardly. Consequently, the seat-slide upper rails 62 and thereby the seat cushion 1a of the driver's seat 1 are moved rearwardly.

Further, since the seat-slide lower rails 61 is disposed on the vehicle floor 9 in the inclined state in which the level of its front portion is slightly higher, the seat cushion 1*a* is pushed upwardly as the seat-slide upper rails 62 and the seat cushion 1*a* of the driver's seat 1 move forwardly along the seat-slide lower rails 61. On the contrary, the seat cushion 1*a* is lowered as the seat-slide upper rails 62 and the seat cushion 1*a* of the driver's seat 1 move rearwardly along the seat-slide lower rails 61.

Moreover, at each of the seat-slide upper rails 62 is provided the inclination-angle adjusting mechanism 3 which adjusts the inclination angle of the seat cushion 1*a* of the driver's seat 1. The inclination-angle adjusting mechanism 3, as shown in FIGS. 6 and 7, comprises a cushion frame 71 which is provided at a side portion of the seat cushion 1*a*, a front bracket 72 and a front link 73 which are provided on a front upper face of the seat-slide upper rail 62 and supports a front end of the cushion frame 71, a rear bracket 74 and a triangular-shaped rear link 75 which are provided on a rear upper face of the seat-slide upper rail 62 and supports a rear portion of the cushion frame 71, a connecting shaft 76 which interconnects rear end portions of the both-side rear links 75 and rear end portions of the both-side cushion frames 71, a center link 77 which transmits a drive force to the rear link 75 and a center bracket 78 which is provided on a central upper face of the seat-slide upper rail 62 and supports this center link 77, a connecting link 79 which connects an upper portion of the central link 77 to a front end of the rear link 75, a drive shaft 80 which will be described below, and a drive lever 81 and an inclination drive portion 82.

The central link 77 is fixed to the drive shaft 80 which extends in the vehicle width direction at its end portion, and this link 77 is rotatably supported at the central bracket 78 via the drive shaft 80. The drive lever 81 which rotates the drive shaft 80 is fixed to the drive shaft 80. Herein, the above-described inclination drive portion 82 which drives this drive lever 81 is provided at the central bracket 78 which is fixed to either one of the seat-slide upper rails 62 (one on the outward side).

Figure 9:
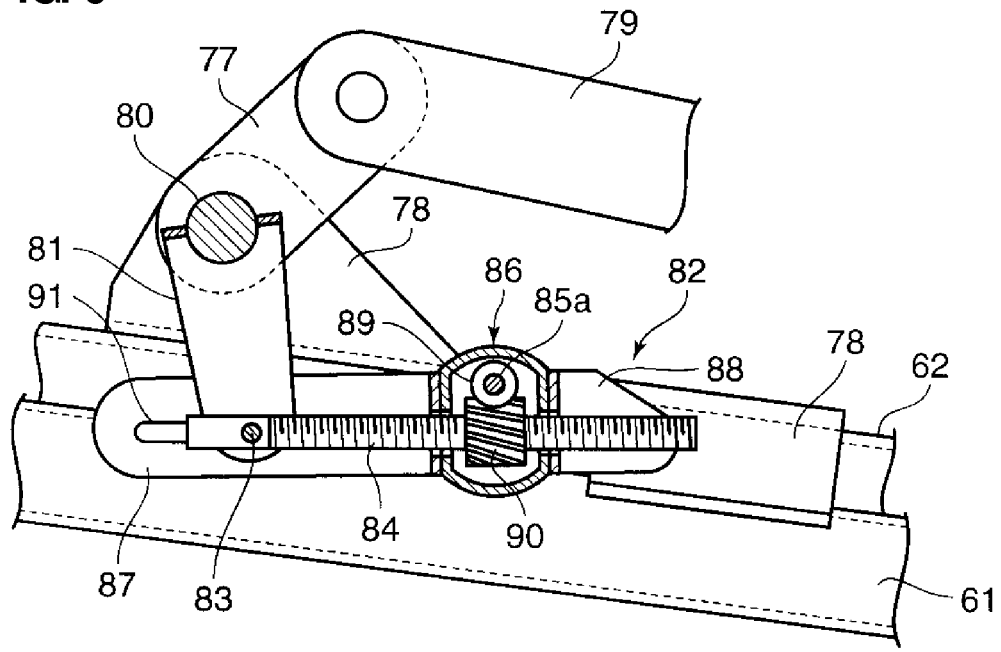
FIG. 9 is a side sectional view showing a specific structure of an inclination angle adjusting mechanism.
Figure 10:
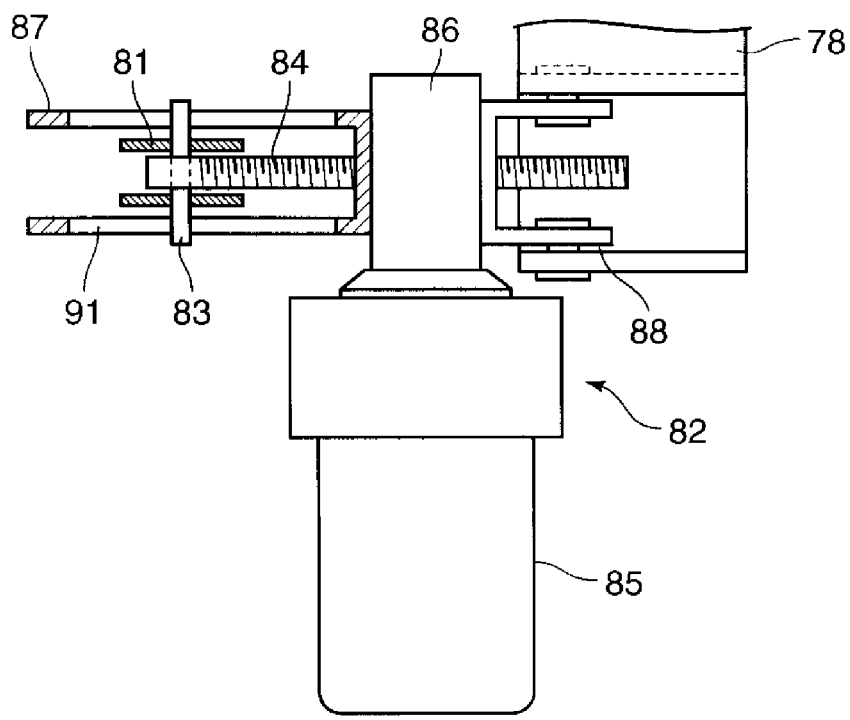
FIG. 10 is a plan sectional view showing the specific structure of the inclination angle adjusting mechanism.

The inclination drive portion 82 comprises, as shown in FIGS. 9 and 10, a screw shaft 84 which is connected to a tip (lower end) of the drive lever 81 via a connecting pin 83 at its front end, a drive motor 85 to rotate the screw shaft 84 and a gear mechanism 86, and a guide bracket 87 which is fixed to a front face of the gear mechanism 86 and a base end of which is supported at the central bracket 78 via a support bracket 88. Further, the gear mechanism 86 comprises a worm gear 89 which is fixed to an output shaft 85*a* of the drive motor 85 and a worm nut 80 which is rotated by the worm gear 89. The worm nut 90 has a screw hole formed thereat which the screw shaft 84 engages with.

Herein, as the worm nut 90 is rotated by the drive force which is inputted from the drive motor 85 via the worm gear 89, the screw shaft 84 is rotated. Thereby, the connecting pin 83 at the tip of the screw shaft 84 moves longitudinally along a support groove 91 which is formed at the guide bracket 87, and the drive force is transmitted to the drive lever 81 via the connecting pin 83. Accordingly, the drive lever 81 swings and thereby the drive shaft 80 is rotated.

Further, the central link 77 swings according to the rotation of the drive shaft 80, and the rotational drive force is transmitted to the rear link 75 via the connecting link 79. As the rear link 75 swings, the front link 73 also swings. Consequently, the inclination angle of the seat cushion 1*a* can be adjusted. That is, when the seat cushion 1*a* of the driver's seat 1 moves to its rear position, as shown in FIG. 6, the front link 73 and the central link 77 take a their rearward slant positions and the connecting shaft 76 which is provided at the rear end of the rear link 75 takes its lower position. Consequently, a sitting face of the seat cushion 1*a* is held in its slant state in which it rear portion lowers greatly.

Figure 11:
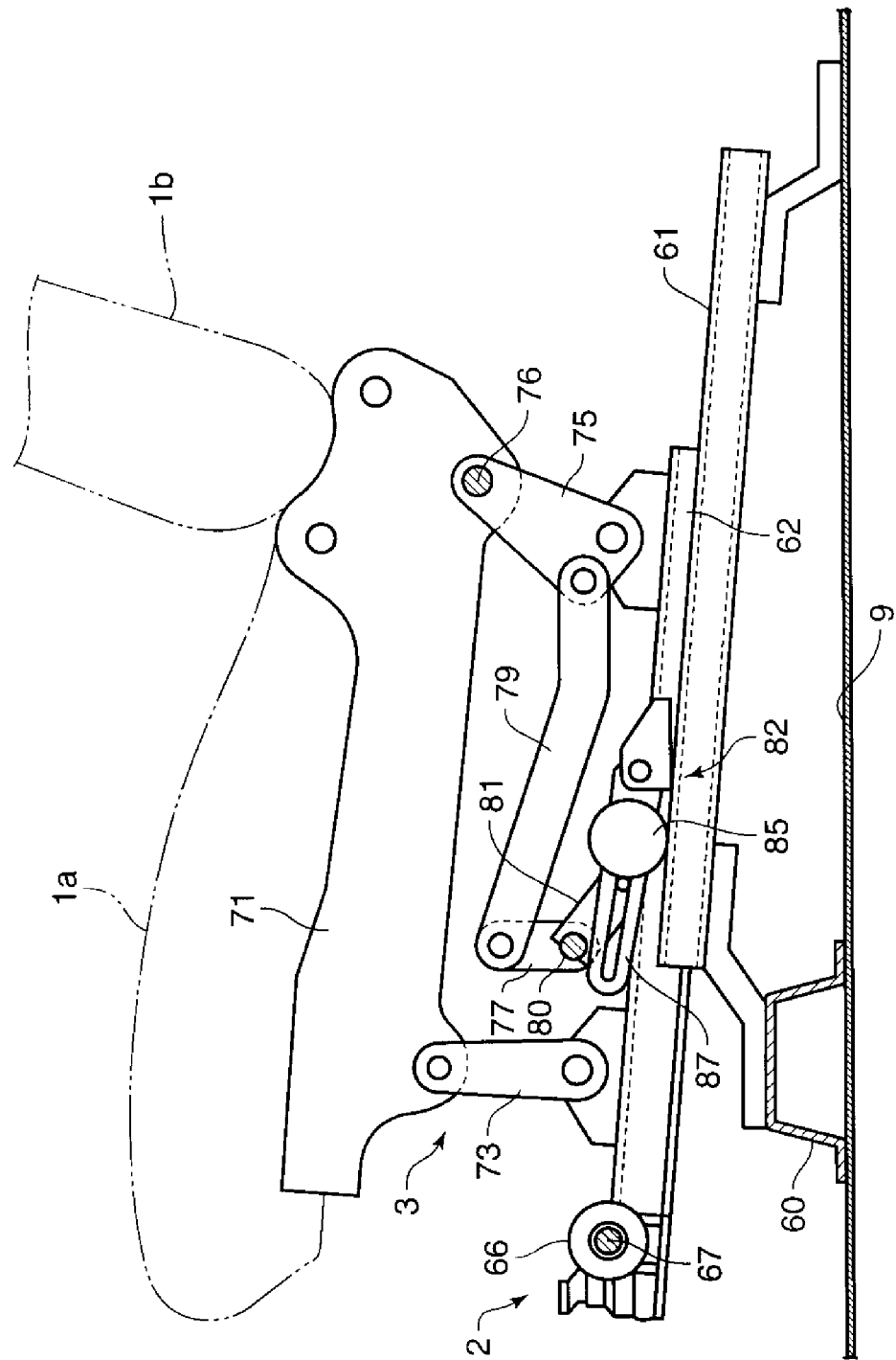
FIG. 11 is a side view showing a state in which a seat cushion is moved forwardly of a vehicle body.

According to the above-described structure, when the forward moving operation of the driver's seat 1 with the longitudinal adjusting switch is conducted, the control signal for rotating the drive motor 85 of the inclination-angle adjusting mechanism 3 in the normal direction is outputted from the controller, not illustrated, based on preset drive characteristics. The driving force of the normal-direction rotation of the drive motor 85 is transmitted to the central link 77 via the gear mechanism 86, screw shaft 84, connecting pin 83, drive lever 81 and drive shaft 80, and thereby the central link 77 changes its position from the rearward slant state to its standing state which is shown in FIG. 11. According to this position change of the central link 77 to the standing state, the drive force is transmitted to the rear link 75 via the connecting link 79, and the front end of the rear link 75 is pulled forwardly. Accordingly, the connecting shaft 76 which is provided at the rear end of the rear link 75 rises up, so that the rear end portion of the seat cushion 1*a* is pushed upwardly.

Further, since the front link 73 moves from its rearward slant state to its standing state according to the swing move of the rear link 75, the seat cushion 1*a* moves in such a manner that its front end portion rises and moves forwardly, so that the seat cushion 1*a* moves from the lower position to the upper position shown in FIG. 11. Herein, since the upper move quantity of the rear end portion of the seat cushion 1*a* is set to be greater than that of the front end portion of the seat cushion 1*a*, the seat cushion 1*a* moves so as to approach a horizontal state gradually. Depending on this move of the seat cushion 1*a*, the seat back 1*b* moves so as to approach its upright position.

Meanwhile, when the rearward moving operation of the driver's seat 1 with the longitudinal adjusting switch is conducted, the control signal for rotating the drive motor 85 of the inclination-angle adjusting mechanism 3 in the reverse direction is outputted from the controller, not illustrated, based on preset drive characteristics. The driving force of the reverse-direction rotation of the drive motor 85 is transmitted to the central link 77 via the gear mechanism 86, screw shaft 84, connecting pin 83, drive lever 81 and drive shaft 80. Accordingly, as shown in FIG. 6, the seat cushion 1*a* changes from the upper position to the lower position. Herein, the drive characteristics are set in such a manner that the rearward inclination angle of the sitting face of the seat cushion 1*a* increases and the seat back 1*b* slants rearward greatly depending on the lowering of the seat cushion 1*a*.

Herein, if the driver seated in the driver's seat 1 changes to a different driver having a different height, the eye point of the driver seated, operational functions for the operational pedals and the like may change because the driver's sitting height, the length of the driver's arm, the length of the driver's leg and the like change as well. Therefore, the new driver may try to operate the longitudinal-position adjusting mechanism 2 and the inclination-angle adjusting mechanism 3 to adjust the driver's position so that the driver can holds a steering wheel 92 in the properly comfortable position, make the ball of the driver's foot properly contact the pressing portion 20 of the movable pedal member 17 of the accelerator pedal 4, and the clear front view of the driver can be ensured by matching the driver's eye point to an appropriate line L.

The drivers with the height within the range of 150 to 190 cm may be seated in the driver's seat 1, so it is necessary that any driver can be seated in the seat 1 having the comfortable sitting position and conduct the driving operation properly.

Herein, the height of the average-sized driver M may be considered as 170 cm, for example, so that the statistical analysis on comfortable (appropriate) position for the average-sized driver M with the height of 170 cm was conducted, and the results below were obtained.

Figure 12:
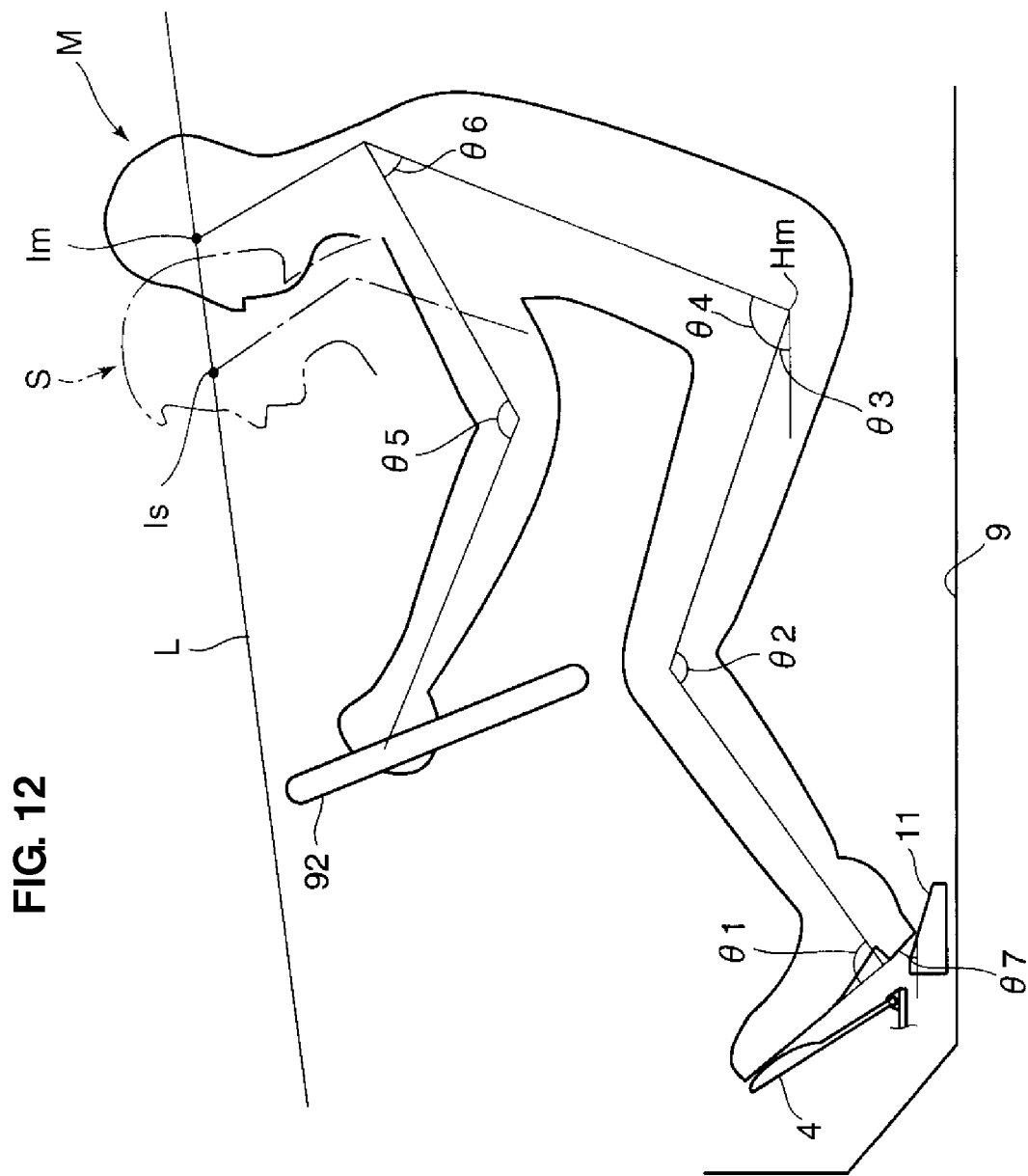
FIG. 12 is an explanatory diagram showing a sitting state of an average-sized driver.

Herein, the comfortable position of the driver seated in the driver's seat 1 means a sitting position which can make the driver keep the sitting state for a long period of time and also suit for operating the steering wheel, pedals and so on. Specifically, as shown in FIG. 12, the angle of ankle θ1 is about 85 to 95 degrees, the angle of knee θ2 is about 115 to 135 degrees, and the bending angle θ4 between the upper half body and the thigh portion is about 95 degrees. Further, it has been recognized from the human-technology tests that the appropriate angle of the thigh angle θ3 relative the horizontal line for the average-sized driver M is an angle which is obtained by adding about 1.5 degrees to the inclination angle of the seat cushion 1a. Further, the elbow angle θ5 which can provide the proper operation of steering wheel 92 is about 100 to 130 degrees, and the armpit portion angle θ6 is about 20 to 45 degrees.

Accordingly, the longitudinal standard position and the vertical standard position of the seat cushion 1a are set so that when the above-described average-sized driver M is seated in the driver's seat in a state, for example, in which the ankle angle θ1 is 90 degrees, the knee angle θ2 is 125 degrees, the bending angle θ4 between the upper half body and the thigh portion is degrees, and the thigh angle θ3 is 17 degrees, the eye point Im of the average-sized driver M can be made match the appropriate line L which has the inclination angle of 8 degrees.

Figure 13:
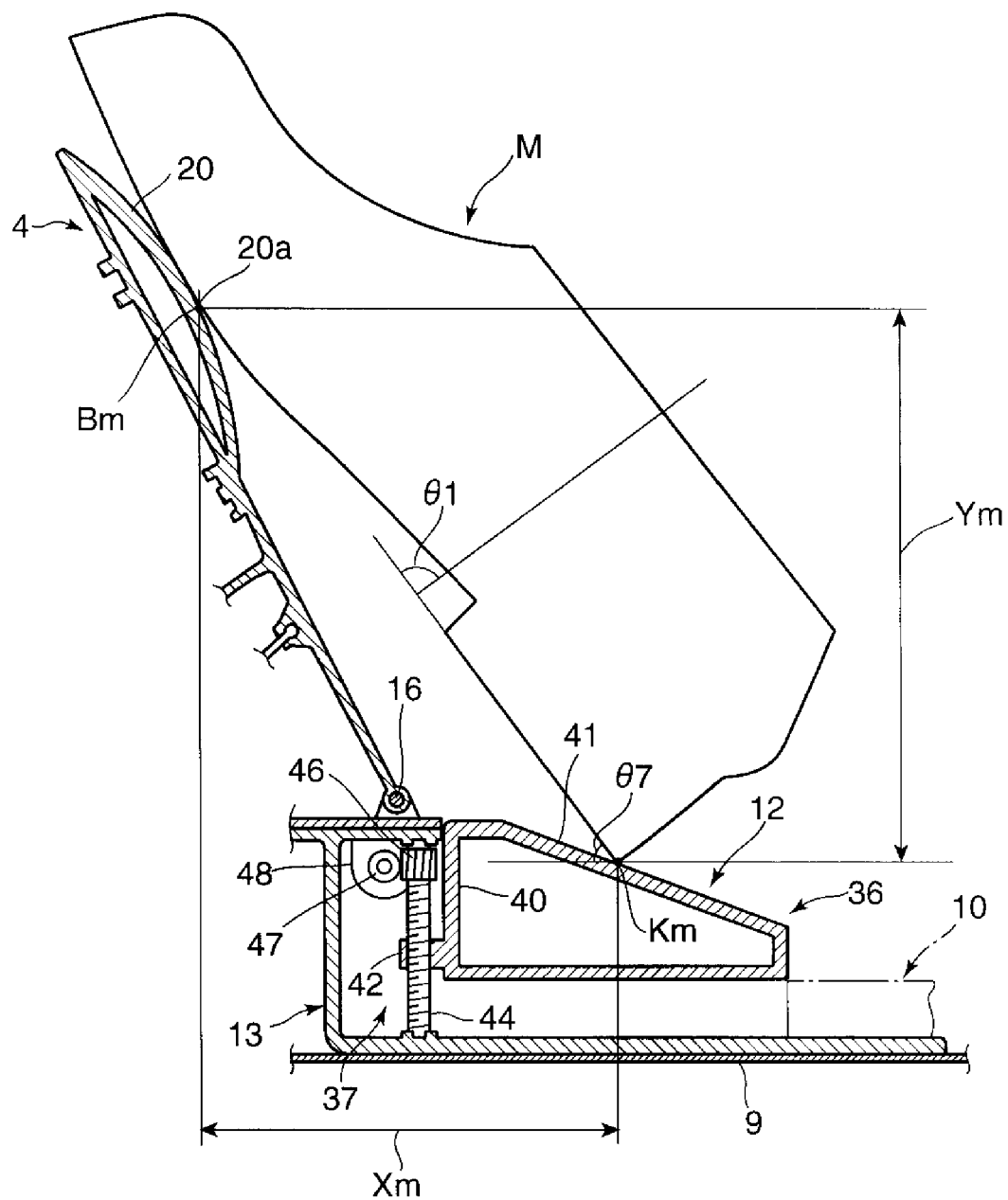
FIG. 13 is an explanatory diagram showing a heel placement state of the average-sized driver.

According to the above-described standard sitting state of the average-sized driver M, the elbow angle θ5 and the armpit portion angle θ6 are set within the above-described respective ranges so that the driver can hold the steering wheel 92 properly. Further, as shown in FIG. 13, the accelerator pedal 4 is disposed at an appropriate position of the pressing portion 20 of the movable pedal member 17 of the accelerator pedal 4, that is, at a position which can make the ball of the hoot Bm of the driver's hoot contact the central position of the pressing portion 20, in a state in which a heel's lower end Km of the driver's foot on the pedal is placed at a specified position on the incline-face portion 11 of the above-described upper-face plate 41, the ankle angle θ1 is set at 90 degrees, and the inclination angle θ7 of the sole relative to the horizontal line is set at about 52 degrees.

In FIG. 12, a reference character Hm denotes the hip point (sitting standard point) of the average-sized driver M seated in the driver's seat 1. Further, according to the present embodiment, as shown in FIG. 13, the standard disposition position of the heel's lower end Km of the average-sized driver M is set to a specified position on the upper-face plate 41 of the movable floor portion 36 which is located in its middle height position, for example. That is, the movable floor portion 36 is disposed so that the heel's lower end Km of the average-sized driver M can be placed at a central position (standard position) on the upper-face plate 41 in the longitudinal direction when the movable floor portion 36 is located in its middle height position.

Since the length of the sole of the average-sized driver M is about 255 mm and the distance from the heel's lower end Km to the ball of the hoot Bm is about 176 mm, a vertical distance Ym from the standard placement position of the heel's lower end Km to the pressing portion 20 of the movable pedal member 17 is about 139 mm (nearly equal to 176 mm×sin 52°). Meanwhile, a horizontal distance Xm from the heel's lower end Km to the pressing portion 20 of the movable pedal member 17 is about 108 mm (nearly equal to 176 mm×cos 52°).

Figure 14:
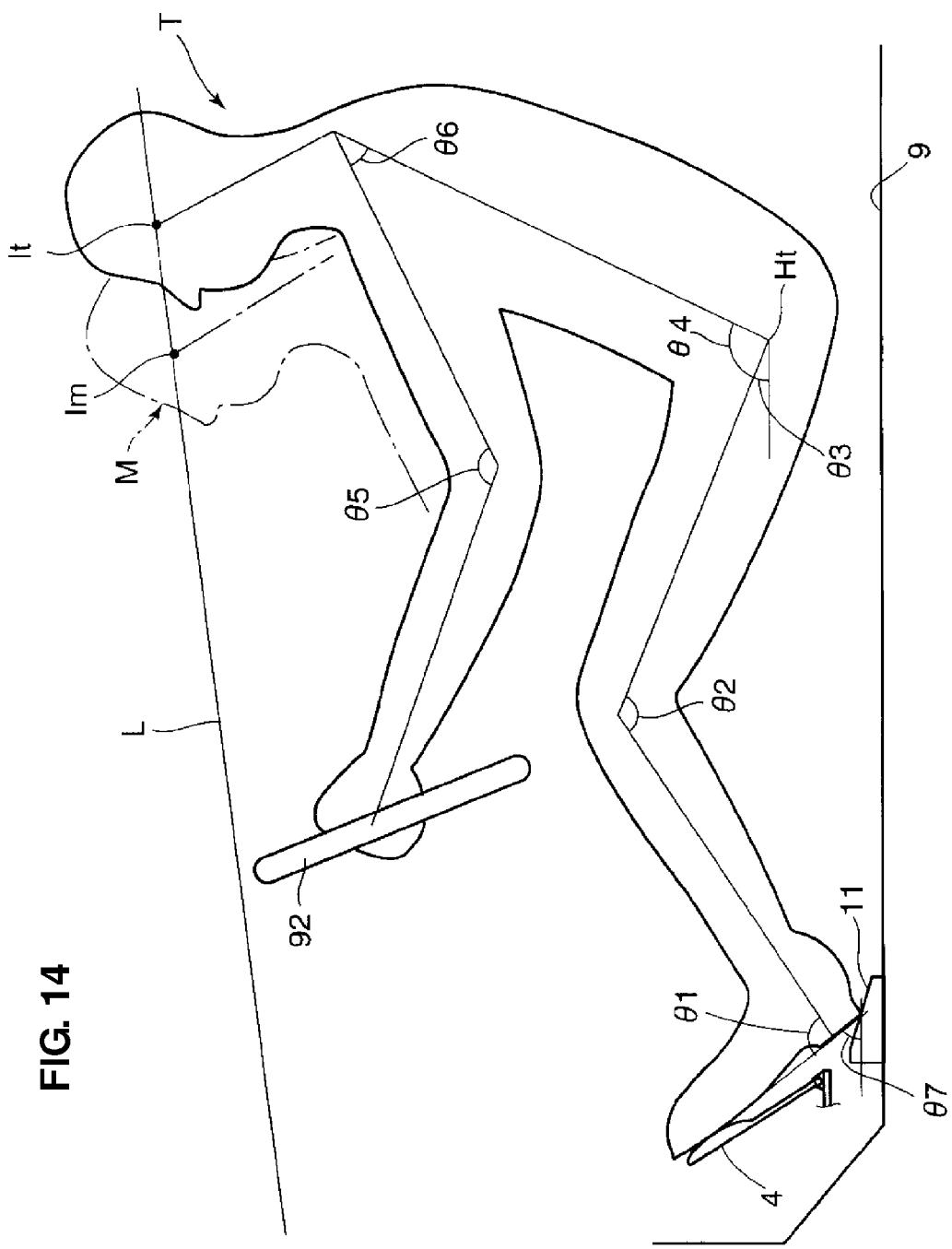
FIG. 14 is an explanatory diagram showing a sitting state of a tall driver.

Herein, when the driver seated in the driver's seat 1 changes from the average-sized driver M to the tall driver T with the height of 190 cm, for example, as shown in FIG. 14, the tall driver T operates some adjusting switches, not illustrated, so as to move the hip point Ht on the seat cushion 1a rearwardly about 85 mm from the longitudinal standard position Hm of the average-sized driver M and downwardly about 20 mm, and to change the inclination angle of the seat cushion 1a so that the thigh angle θ3 can become about 20.0 degrees.

As a result, the upper half body of the tall driver T who has a longer arm than that of the average-sized driver M is moved rearwardly so that the steering wheel 92 can be held in the appropriate position, and the eye point It of the tall driver T who has a longer sitting height than that of the average-sized driver M is moved downwardly and rearwardly so that the eye point It can match the appropriate line L. Herein, in case of providing a telescopic and tilt mechanism to adjust the disposition position and angle of the steering wheel 92, the tall driver T may hold the steering wheel 92 properly keeping the above-described comfortable position, without changing the elbow angle θ5 and the armpit portion angle θ6 greatly.

Moreover, there is a tendency that the sole of the pedal-operating foot of the tall driver T rotates clockwise around the ball of the foot Bt in accordance with the downward and rearward move of the seat cushion 1a. Therefore, by moving down the movable floor portion 36 and decreasing the knee angle θ2 to about 120 degrees accordingly, the ankle angle θ1 of the pedal-operating foot can be maintained at 90 degrees, the inclination angle θ7 of the sole can be kept at about 52 degrees, and the ball of the foot Bt of the tall driver T can be made contact the pressing portion 20 of the accelerator pedal 4.

Specifically, as shown in FIG. 3, since the length of the sole of the tall driver T is about 285 mm and the distance from the heel's lower end Km to the ball of the foot Bm is about 198 mm, a vertical distance Yt from the placement position of the heel's lower end Km of the tall driver T to the pressing center 20a of the movable pedal member 17 is about 156 mm (nearly equal to 198 mm×sin 52°), which is about 17 mm longer than the vertical distance Ym (139 mm) of the average-sized driver M. Thus, the heel-placement height position of the tall driver T is located about 17 mm below that of the average-sized driver M. Meanwhile, a horizontal distance Xt from the heel's lower end Kt of the tall driver T to the pressing center 20a of the movable pedal member 17 is about 122 mm (nearly equal to 198 mm×cos 52°), which is about 14 mm longer than the horizontal distance Xm (108 mm) of the average-sized driver M.

As described above, there is a difference of about 17 mm in the heel-placement height position between the tall driver T and the average-sized driver M, and there is a difference of about 14 mm in the heel-placement longitudinal position between the tall driver T and the average-sized driver M. Accordingly, in order that the tall driver T makes the ball portion Bt of the pedal-operating foot contact the appropriate position of the pressing center 20a in the state in which the heel's lower end Kt is properly placed on the movable floor portion 36, it is necessary that the position of the movable floor portion 36 is lowered by about 12 mm (nearly equal to 17 mm−5 mm) based on the height-position difference of the heel's lower end: 17 mm and a vertical difference corresponding to the longitudinal-position difference of the heel's lower end: −5 mm (nearly equal to −14 mm×tan 20°).

That is, according to the present embodiment with the inclination angle of the incline-face portion 11 set at 20 degrees, the movable floor portion 36 is moved down to near the lowermost position which is about 12 mm below the above-described standard position, so that the mount of moving up the movable floor portion 36 can be almost zero. Thus, by positioning the movable floor portion 36 at the height position which is about 12 mm below the standard position of the average-sized driver M, the tall driver T can properly operate the operational pedal in the state in which the heel's lower end Kt is placed on the movable floor portion 36 and the ball of the hoot Bt contacts the pressing center 20a of the accelerator pedal 4.

Meanwhile, when the driver seated in the driver's seat 1 changes from the average-sized driver M to the short driver S, such as an woman driver having the height of 150 cm, as shown in FIG. 1, this short driver S operates some adjusting switches, not illustrated, so as to move the hip point Hs on the seat cushion 1a forwardly about 105 mm from the longitudinal standard position Hm of the average-sized driver M and upwardly about 25 mm, and to change the inclination angle of the seat cushion 1a so that the thigh angle θ3 can become about 10.5 degrees.

As a result, the upper half body of the short driver S who has a shorter arm than that of the average-sized driver M is moved forwardly, so that the eye point Is of the short driver S who has a shorter sitting height than that of the average-sized driver M is moved upwardly and forwardly so that the eye point Is can match the appropriate line L. Further, by changing the elbow angle θ5 and the armpit portion angle θ6 properly or changing the height position and angle of the steering wheel 92 with the operation of the telescopic and tilt mechanism, not illustrated, the short driver S can hold the steering wheel 92 in the proper state.

Moreover, there is a tendency that the sole of the pedal-operating foot of the short driver S rotates counterclockwise around the ball of the foot Bs in accordance with the upwardly and forwardly move of the seat cushion 1a. Therefore, by moving up the movable floor portion 36 and increasing the knee angle θ2 to about 130 degrees accordingly, the ankle angle θ1 of the pedal-operating foot can be maintained at 90 degrees, the inclination angle θ7 of the sole can be kept at the proper angle (52 degrees), and the ball of the foot Bs of the short driver S can be made contact the pressing center 20a of the accelerator pedal 4.

Figure 5:
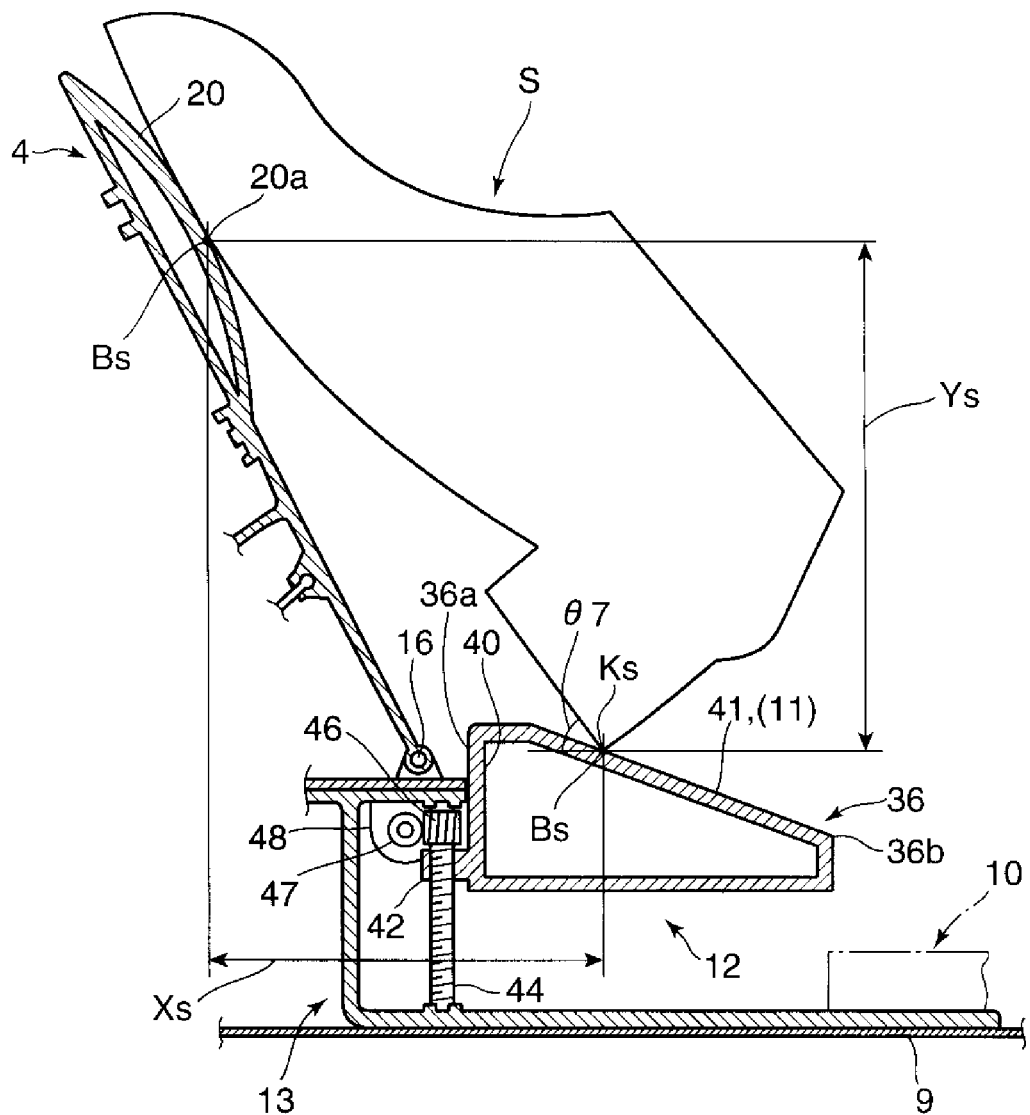
FIG. 5 is a side sectional view showing a state in which a movable floor portion is moved up.

Specifically, as shown in FIG. 5, since the length of the sole of the short driver S is about 225 mm and the distance from the heel's lower end Ks to the ball of the foot Bs is about 155 mm, a vertical distance Ys from the placement position of the heel's lower end Ks of the short driver S to the pressing center 20a of the movable pedal member 17 is about 122 mm (nearly equal to 155 mm×sin 52°), which is about 17 mm shorter than the vertical distance Ym (139 mm) of the average-sized driver M. Thus, the heel-placement height position of the short driver S is located about 17 mm above that of the average-sized driver M. Meanwhile, a horizontal distance Xs from the heel's lower end Ks of the short driver S to the pressing center 20a of the movable pedal member 17 is about 95 mm (nearly equal to 155 mm×cos 52°), which is about 13 mm shorter than the horizontal distance Xm (108 mm) of the average-sized driver M.

There is a difference of about 17 mm in the heel-placement height position between the short driver S and the average-sized driver M, and there is a difference of about 13 mm in the heel-placement longitudinal position between the short driver S and the average-sized driver M. Accordingly, in order that the short driver S makes the ball portion Bs of the pedal-operating foot contact the appropriate position of the pressing center 20a in the state in which the heel's lower end Ks is properly placed on the movable floor portion 36, it is necessary that the position of the movable floor portion 36 is move up by about 13 mm (nearly equal to 17 mm−4 mm) based on the height-position difference of the heel's lower end: 17 mm and a vertical difference corresponding to the longitudinal-position difference of the heel's lower end: −4 mm (nearly equal to −13 mm×tan 20°).

That is, according to the present embodiment with the inclination angle of the incline-face portion 11 set at 20 degrees, the movable floor portion 36 is moved up closely to the uppermost position which is about 13 mm above the above-described standard position, so that the mount of moving up the movable floor portion 36 from the lowermost position can be almost 25 mm. Thus, by positioning the movable floor portion 36 at the height position which is about 13 mm above the standard position of the average-sized driver M, the short driver S can properly operate the operational pedal in the state in which the heel's lower end Ks is placed on the movable floor portion 36 and the ball of the hoot Bs contacts the pressing center 20a of the accelerator pedal 4.

As described above, there is provided the driving position adjusting apparatus for a vehicle, comprising the driver's seat 1 which is provided on the floor panel 9 of the vehicle compartment, the operational pedal, such as the accelerator pedal 4, which is operated by the driver seated in the driver' seat 1, the incline-face portion 11 which is provided on the floor panel 9, on which the heel of the driver operating the operational pedal is placed, the incline-face portion 11 having the upper face which is inclined so that its front portion is located at the higher position than its rear portion, and the heel-placement height adjusting device 12 which adjusts the height position of the driver's heel placed on the incline-face portion 11 at least by moving up or down the incline-face portion 11. Thereby, the moving range of the incline-face portion 11 can be restrained from being improperly large, and the knee's angle and the sole's inline angle of the driver can be kept in proper ranges regardless of the body size of the driver, i.e., the short driver S with a relatively short sole or the tall driver with a relatively long sole, so that the appropriate pedal operation can be obtained having the driver's heel properly placed on the incline-face portion.

That is, as described in the first embodiment, when the heel-placement position of the short driver S is positioned about 13 mm forwardly from that of the average-sized driver M and the incline-face portion 11 is inclined by about 20 degrees, the amount of moving up the incline-face portion 11 can be decreased by about 4 mm (nearly equal to 13 mm×tan 20°), compared with a case in which the heel-placement area is formed horizontally. Meanwhile, when the heel-placement position of the tall driver T is positioned about 14 mm rearwardly from that of the average-sized driver M, the amount of moving down the incline-face portion 11 can be decreased by about 5 mm (nearly equal to 14 mm×tan 20°), compared with the case in which the heel-placement area is formed horizontally.

Further, since the incline-face portion 11 having the upper face which is inclined so that its front portion is located at the higher position than its rear portion, the heel of the pedal-operating foot can be prevented from moving forwardly by this inclination of the incline-face portion 11 at a vehicle frontal collision. Accordingly, the safety of the driver can be properly improved.

Herein, if the inclination angle α of the upper face of the incline-face portion 11 is greater than 23.5 degrees, there is a tendency that the heel's lower end of the pedal-operating foot placed on the inline-face portion 11 slips down rearwardly due to a reaction force which may occur during the pedal operation. Therefore, it is preferable that the above-described inclination angle α be set at an angle of 23.5 degrees ore smaller so that a stable placement of the heel's lower end. On the other hand, if the inclination angle α of the upper face of the incline-face portion 11 is smaller than 13.5 degrees, the above-described effect that the moving range of the movable floor portion 36 can be restrained from being improperly large may be deteriorated. Therefore, it is preferable that the inclination angle α be set at an angle of 13.5 degrees or greater.

Further, according to the first embodiment, the heel-placement height adjusting device 12 comprises the movable floor portion 36 which is supported on the floor panel 9 so as to move up or down, and the drive portion 37 which drives the movable floor portion 36 for moving up or down of the movable floor portion 36, and the incline-face portion 11 is arranged on the upper face of the movable floor portion 36. Thereby, the height position of the driver's heel placement can be adjusted with the simple structure by moving up or down the movable floor portion 36, so that the appropriate pedal operation can be obtained regardless of the driver's body size, i.e., the short driver S with the shorter sole's length, or the tall driver T with the longer sole's length compared with the average-sized driver M.

Moreover, as shown in the first embodiment, the longitudinal length and the longitudinal position of the movable floor portion 36 is set based on the foremost position and the rearmost position of the driver's heel which is changeable depending on the body size and the sitting position of the driver seated in the driver's seat 1, i.e., the tall driver T or the short driver S. Thereby, it can be prevented that the size of the movable floor portion 36 and the drive portion 37 becomes improperly large which may be caused by the large moving range of the incline-face portion 11, ensuring the above-described advantages of the adjustment of the height position of the driver's heel placement. Accordingly, the structure can be made simple effectively.

For example, since in the first embodiment, as shown in FIG. 3, the rear-end position 36b of the movable floor portion 36 is located at the position which is 155 mm rearward from the pressing center 20a of the accelerator pedal 4, the tall driver T with the height of 190 cm can operate (press) the accelerator pedal 4 with the ball of the pedal-operating foot Bt contacting the pressing portion 20 of the accelerator pedal 4 in a state in which the sole angle θ7 is set at about 55 degrees and the heel's lower end Kt is placed at a position which is forward from the rear-end position 36b (see FIG. 3).

Meanwhile, by locating the front-end position 36a of the movable floor portion 36 at the position which is 65 mm rearward from the pressing center 20a of the accelerator pedal 4 as shown in the first embodiment, the short driver S with the height of 150 cm can operate (press) the accelerator pedal 4 with the ball of the pedal-operating foot Bs contacting the pressing portion 20 of the accelerator pedal 4 in a state in which the sole angle θ7 is set at about 49 degrees and the heel's lower end Ks is placed at a position which is rearward from the front-end position of the inline-face portion 11 (see FIG. 5).

Also, by setting the front-end position 36a and the rear-end position 36b of the movable floor portion 36 as shown in the first embodiment, in case the longitudinal length of the movable floor portion 36 is set at bout 90 mm, the movable floor portion 36 can be easily moved up or down without making the size of the movable floor portion and its drive mechanism improperly large or making their structures too complex. Accordingly, the vehicle weight can be decreased effectively and the manufacturing costs of the driving position adjusting apparatus of a vehicle can be suppressed properly.

According to the first embodiment, the operational pedal is the accelerator pedal 4 to control a vehicle traveling drive source. Thereby, the accelerator pedal 4 which may require a delicate operation in a state of having the driver's heel properly placed on the incline-face portion 11 can be operated properly with the simple structure.

Further, the organ type of accelerator pedal 4 comprises the movable pedal member 17 which is operated by the driver and the pedal base member 15 which is fixed to the floor panel 9, and the lower end portion of the movable pedal member 17 is pivotally supported at the pedal base member 15. Thereby, the proper operation of the accelerator pedal 4 can be obtained with the simple structure.

Moreover, since the heel-placement height adjusting device 12 and the operational pedal of the accelerator pedal 4, are assembled to the vehicle body as a unit, assembling of the heel-placement height adjusting device 12 and the operational pedal can be easier as well as ensuring the proper operation of the operational pedal.

That is, since the operational pedal of the organ type of accelerator pedal 4 of the first embodiment comprises the movable pedal member 17 which is operated by the driver and the pedal base member 15 which is fixed to the floor panel 9 via the support base 13, and the pedal base member 15 and the heel-placement height adjusting device 12 are formed as a unit, the operational pedal of the accelerator pedal 4 and the heel-placement height adjusting device 12 are sub-assembled and then can be assembled to the vehicle body easily.

Also, since the heel-placement height adjusting device 12 of the first embodiment comprises the movable floor portion 36 which is supported on the floor panel 9 so as to move up or down and the drive portion 37 which drives the movable floor portion 36 for moving up or down of the movable floor portion 36, and the movable floor portion 36 and the operational pedal of the accelerator pedal 4 are formed as a unit, assembling of the movable floor portion and the operational pedal can be easier.

In particular, since at the heel-placement height adjusting device 12 is provided the support base 13 which supports the movable floor portion 36 so that the movable floor portion 36 moves up or down, and the pedal base member 15 of the operational pedal is attached to the support base 13 as a unit as shown in the first embodiment, the movable floor portion 36 and the operational pedal are sub-assembled, and then the support base 13 can be assembled to the floor panel 9 easily and properly.

Further, since the movable pedal member 17 of the accelerator pedal 4 includes the pressing portion 20 which has the convex face which projects rearwardly of the vehicle, which the ball of the operational foot of the driver (Bm, for example) contacts the driver's pedal pressing in the first embodiment, even in case the driver presses the accelerator pedal 4 in a state in which the heel's lower end of the driver's hoot (Km, for example) is placed at a specified position which is located rearwardly from the support point (lower-end hinge portion 16) of the movable pedal member 17 so that the contact point of the driver's heel with the pressing portion 20 moves vertically in accordance with the pedal pressing, the driver can be effectively prevented from having uncomfortable feelings.

In this case, if the pressing portion of the movable pedal member 17 is formed linearly or in a curve shape with projecting forwardly so as to match the curve of the back face of the driver's shoe, the contact of the back face of the driver's shoe with the pressing portion may be a face contact and the contact point of the back face of the driver's shoe with the pedal pressing face may move forwardly intermittently with slips as the pressing amount of the movable pedal member 17 increases, so that the driver could feel this move too sensitively and thereby have uncomfortable feelings.

According to the first embodiment, however, since the pressing portion 20 of the movable pedal member 17 is comprised of the arc-shaped convex face projecting rearwardly, the back face of the driver's shoe is made contact a point (pressing center point 20*a*, for example) of the convex face of the pressing portion 20 with a line contact. Accordingly, even in case the tall driver T and others press the accelerator pedal in a state in which the heel's lower end Kt of the driver's hoot is placed at the specified position which is located rearwardly from the rear support point of the movable pedal member 17, the contact position of the back face of the driver's shoe with the pressing portion 20 can change smoothly and continuously according to the pressing of the accelerator pedal 4, so that the driver can be effectively prevented from having the uncomfortable feelings. Herein, in order to make the contact position of the back face of the driver's shoe with the pressing portion 20 change smoothly and continuously as described above, it is preferable that the curvature radius of the arc-shaped convex face of the pressing portion 20 be set at a value within a range of 120-200 mm, and the most preferable value may be 150 mm Further, since the first embodiment comprises the seat adjusting mechanism which comprises the longitudinal-position adjusting mechanism 2 and the inclination-angle adjusting mechanism 3, which moves the driver's seat 1 in the longitudinal direction and reduces the rearward inclination angle of the seat cushion 1*a* of the driver's seat 1 in accordance with the forward move of the driver's seat 1, the longitudinal position of the driver's seat 1 and the inclination angle of the seat cushion 1*a* is automatically adjusted so that the driver can keep its proper sitting position regardless of the body size, matching the driver's eye point to the appropriate line L, and get the superior handle and pedal operations.

Further, in case the driver seated in the driver's seat 1 operates the heel-placement height adjusting device 12 in accordance with the operation of adjusting the longitudinal position of the driver's seat 1 and the inclination angle of the seat cushion 1*a*, the height position of the heel placement of the driver can be automatically adjusted so that the pedal operation with the ball of the driver's hoot contacting the pressing portion 20 of the accelerator pedal 4 can be ensured, maintaining the proper angles of the ankle's angle θ1 and the sole's inclination angle θ7 for the pedal operation in a state in which the heel of the driver's hoot is placed on the incline-face portion 11 regardless of the body size of the driver.

Herein, while the driver's seat 1 is automatically moved longitudinally by the longitudinal-position adjusting mechanism 2 according to the switch operation by the driver and the inclination angle of the seat cushion 1*a* is reduced according to the forward move of the driver's seat 1 in the above-described first embodiment, the longitudinal position of the driver's seat 1 and the inclination angle of the seat cushion 1*a* may be adjusted with a manual operation of the driver.

Embodiment 2

Figure 15:
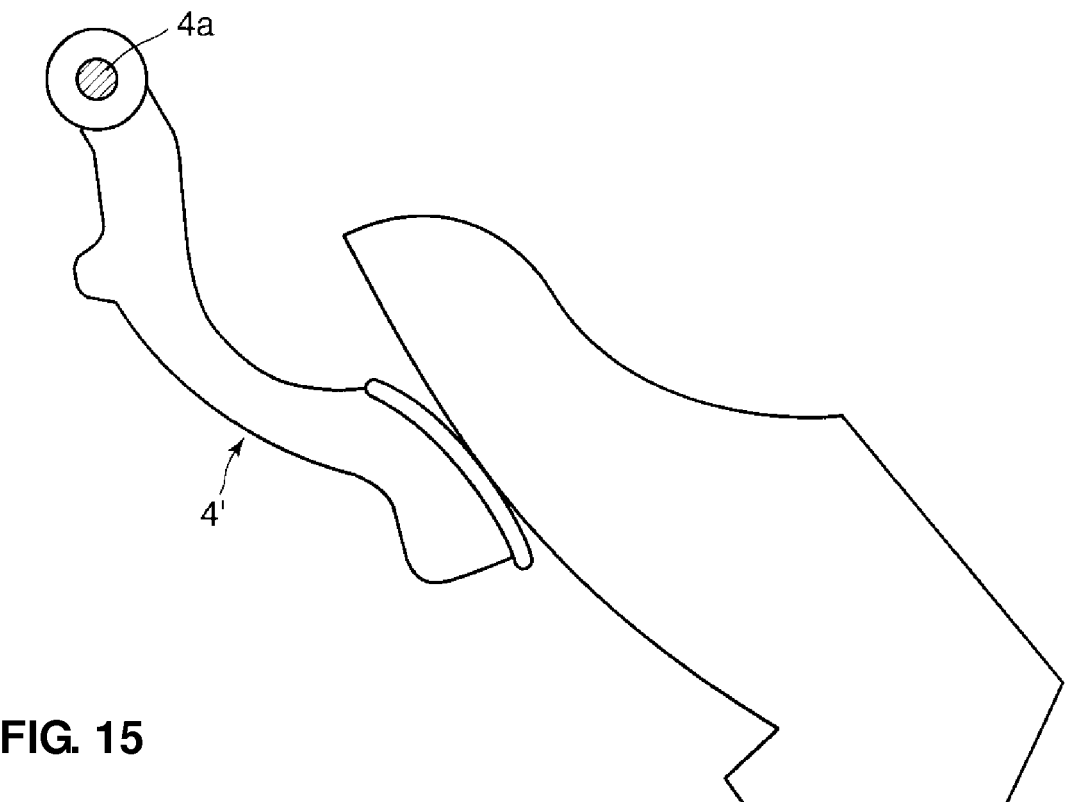
FIG. 15 is a side sectional view showing a second embodiment of the driving position adjusting apparatus for a vehicle according to the present invention.

FIG. 15 shows a second embodiment of the driving position adjusting apparatus of the present invention.

While the present invention is applied to the organ type of accelerator pedal 4 in the above-described first embodiment, a hanging type of accelerator pedal 4' which is supported at an upper-end pivotal point 4*a* which is provided at the dash panel 7 may be used as the second embodiment as shown in FIG. 15. In a vehicle equipped with this hanging type of accelerator pedal 4', it is unnecessary to support the accelerator pedal 4 at the support base 13 which supports the movable floor portion 36. Accordingly, the structure can be simpler.

Embodiment 3

Figure 16:
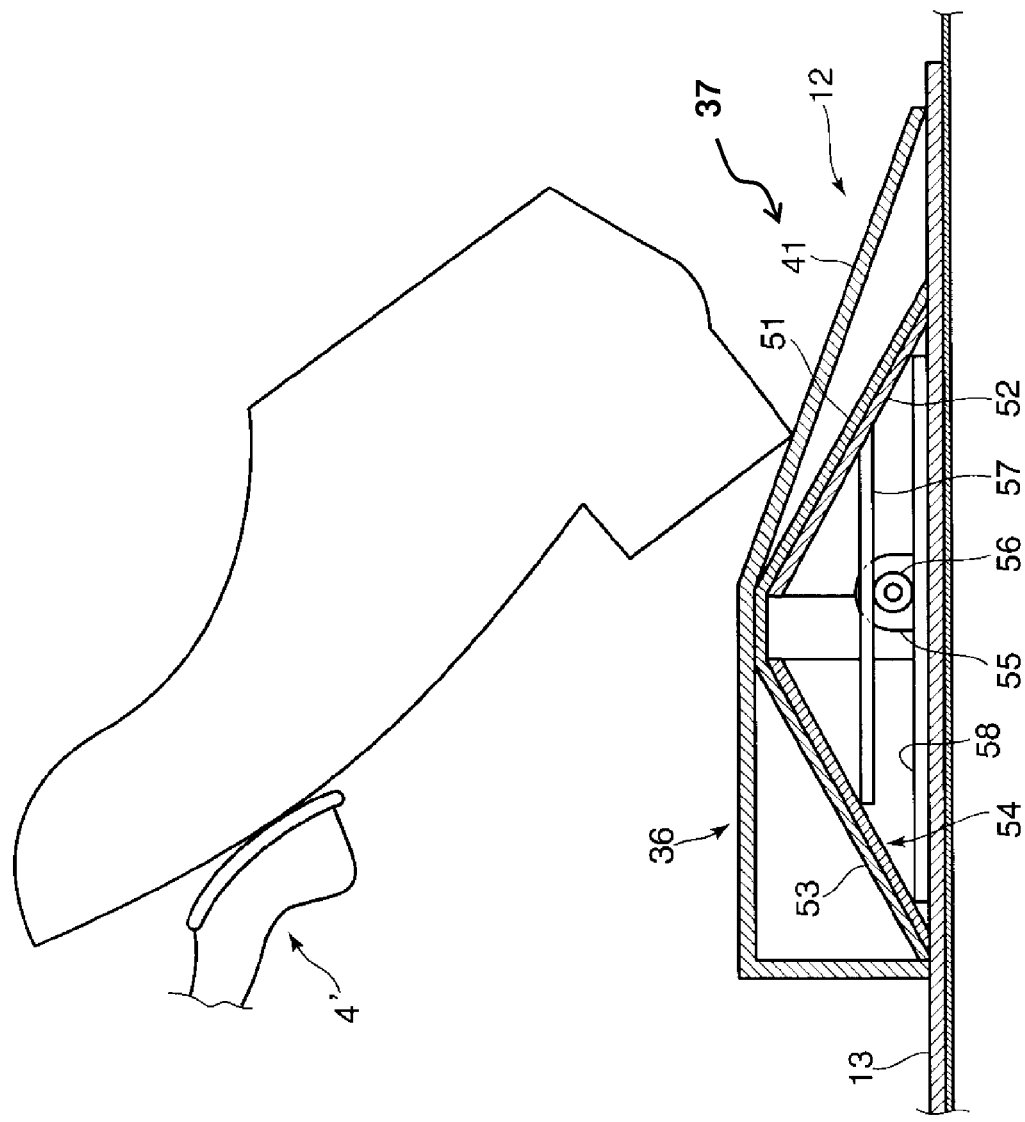
FIG. 16 is a side sectional view showing a third embodiment of the driving position adjusting apparatus for a vehicle according to the present invention.
Figure 17:
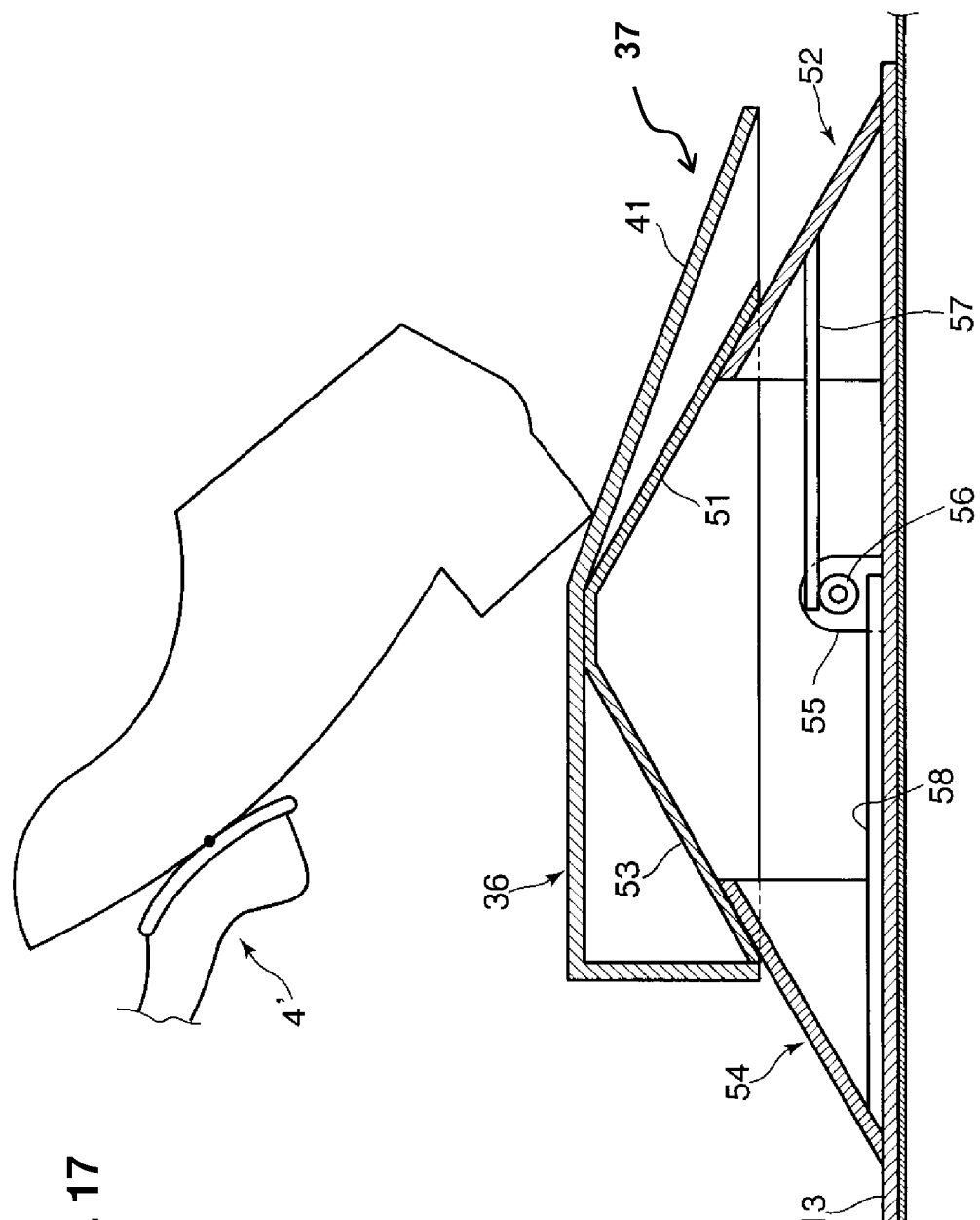
FIG. 17 is a side sectional view showing a state in which the movable floor portion is moved up, which corresponds to FIG. 16.

FIGS. 16 and 17 show a third embodiment of the driving position adjusting apparatus of the present invention.

In the third embodiment, the movable floor portion 36 which has the inline-face portion 11 of the upper face plate 41, a first base 52 which pushes up a rear guide member 51 provided at a rear portion of the movable floor portion 36, a second base 54 which pushes up a front guide member 53 provided at a front portion of the movable floor portion 36, and a drive motor 55 which has a pinion gear 56 fixed to its output shaft are arranged on the support base 13 of the heel-placement height adjusting device 12. Rack gears 57, 58 which are fixed to the first and second bases 52, 54 are driven by the drive motor 55. Herein, the members 52, 54, 55 and others constitute the drive portion 37 which drives the movable floor portion 36 for moving up or down of the movable floor portion 36.

Thus, the drive motor 55 drives the rack gears 57, 58 in accordance with the driver's adjustment of the longitudinal position and the like of the driver's seat 1, so that the first and second bases 52, 54 are moved from an initial position where they are adjacent to each other as shown in FIG. 16 to a rising position where they are away from each other as shown in FIG. 17. Thus, rear and front portions of the movable floor portion 36 are pushed up via the first and second bases 52, 54, respectively. According to this embodiment, the movable floor portion 36 can be driven to move up or down smoothly with a simpler structure.

Embodiment 4

Figure 18:
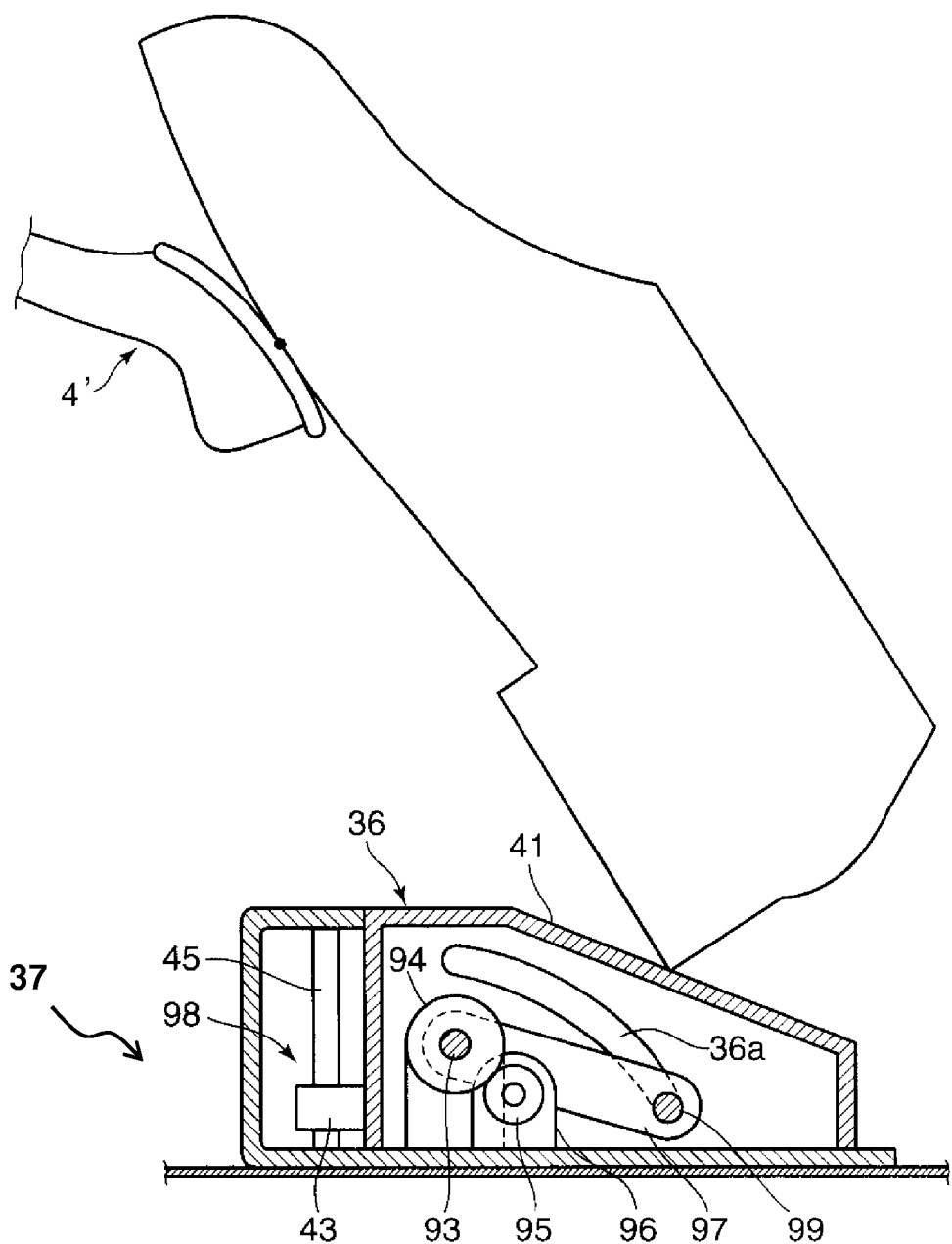
FIG. 18 is a side sectional view showing a fourth embodiment of the driving position adjusting apparatus for a vehicle according to the present invention.
Figure 19:
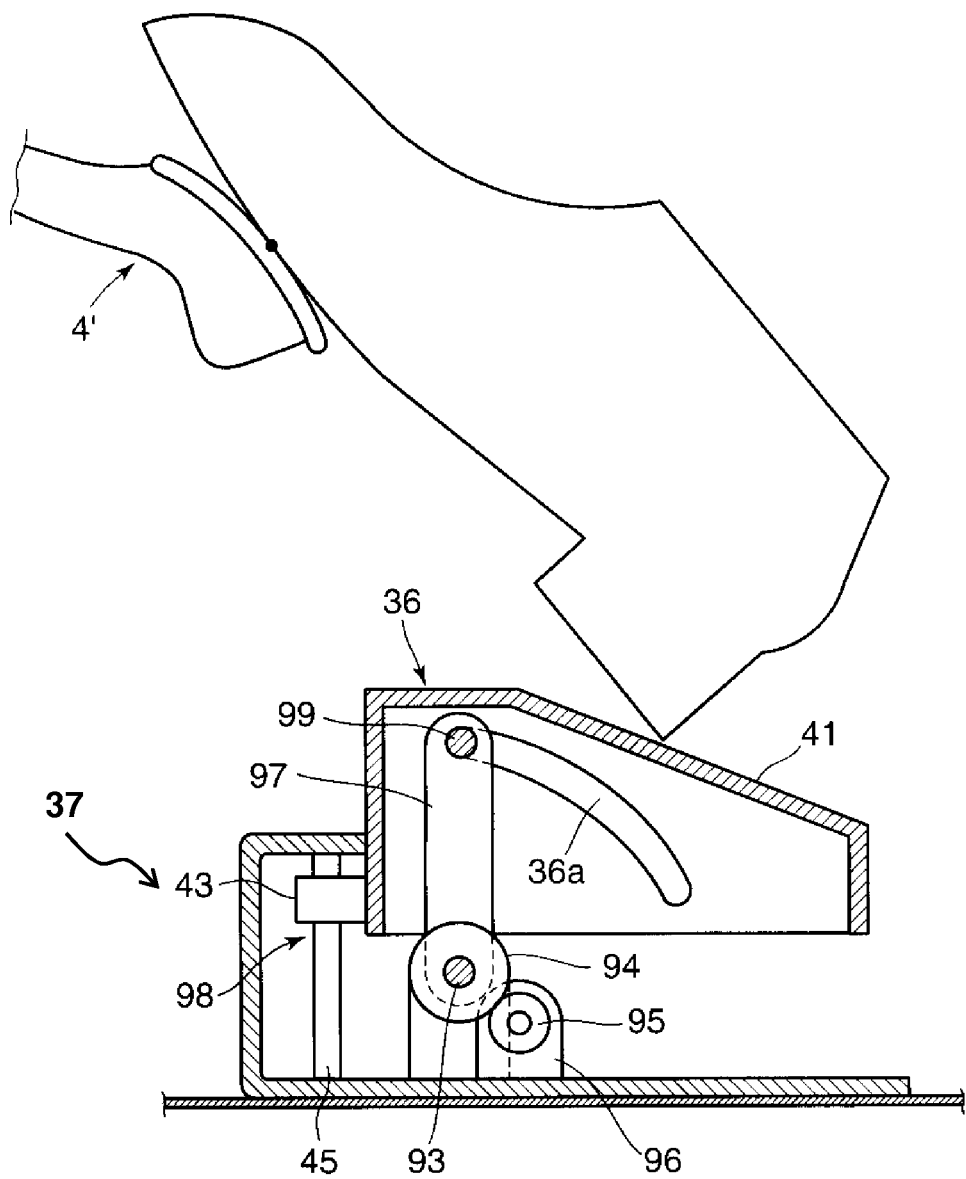
FIG. 19 is a side sectional view showing a state in which the movable floor portion is moved up, which corresponds to FIG. 18.

FIGS. 18 and 19 show a fourth embodiment of the driving position adjusting apparatus of the present invention.

In the fourth embodiment, on the support base 13 of the heel-placement height adjusting device 12 are provided the movable floor portion 36 which has the inclined upper-face plate 41 as the inline-face portion 11, a rotational axis 93 which extends in the vehicle width direction, a drive gear 94 which is fixed to the rotational axis 93, a drive motor 96 which has a pinion gear 95 fixed to its output shaft for driving the drive gear 94, a pair of pushing links 97 which is fixed to the rotational axis 93 and operates to push up the movable floor portion 36, and a guide portion 98 which comprises a projection 43 which is provided at the movable floor portion 36 and a guide bar 45 which supports the projection 43 moving up or down. Herein, the members 93, 94, 96, 97, 98 and others constitute the drive portion 37 which drives the movable floor portion 36 for moving up or down of the movable floor portion 36.

Herein, in accordance with the driver's adjustment of the longitudinal position and the like of the driver's seat 1, the drive motor 96 drives so as to swing the pushing links 97, so that a drive shaft 99 which is fixed to tips of the pushing links 97 is guided so as to slide along an arc-shaped groove 36*a* which is formed at a side plate of the movable floor portion 36. Thus, the movable floor portion 36 is configured to move up or down between its lowering position shown in FIG. 18 and its rising position shown in FIG. 19.

Embodiment 5

Figure 20:
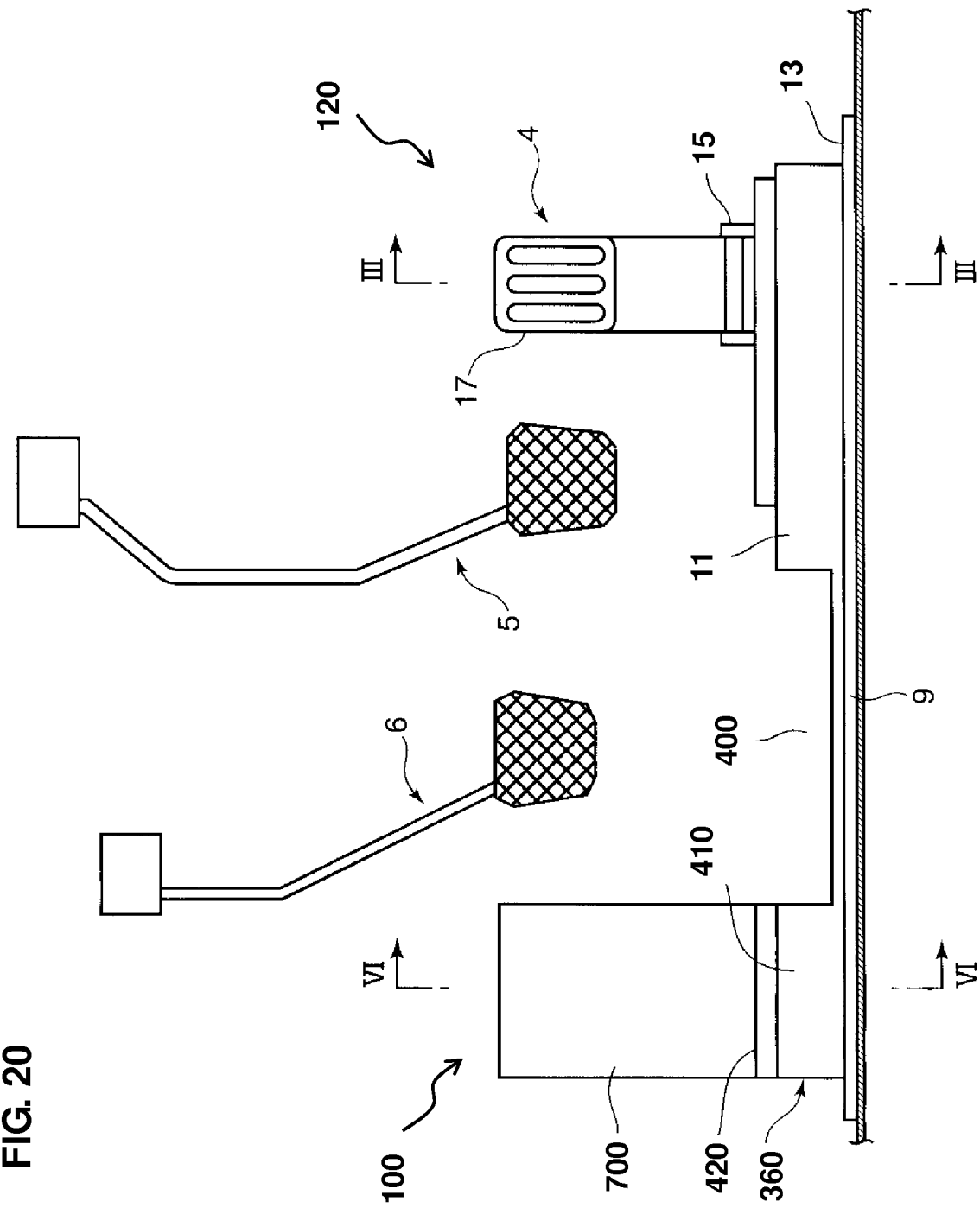
FIG. 20 is a rear view showing a specific structure of an adjusting device of a heel-placement height and a footrest for the driver's hoot of a fifth embodiment of the driving position adjusting apparatus for a vehicle according to the present invention.

FIGS. 20 through 24 show a fifth embodiment of the driving position adjusting apparatus of the present invention. The fifth embodiment shows an example in which the driving position adjusting apparatus for a vehicle further comprises a footrest 700 on which the driver's foot is rested, and a footrest adjusting device 100 which adjusts a rest state of the driver's hoot by the footrest 700 according to the adjustment of a heel-placement height adjusting device 120 which adjusts the height position of the driver's heel placed on the incline-face portion. Herein, the heel-placement height adjusting device 120 performs substantially the same function as the heel-placement height adjusting device 12 in the above-described embodiments. Further, the footrest 700 is arranged beside the respective pedals 4, 5 and 6, that is, on the vehicle central side of these pedals 4, 5 and 6 to support the driver's hoot not operating, that is, the driver's left foot as shown in FIG. 20. The components or structures of the fifth embodiment which are substantially the same as those of the above-described embodiments are denoted by the same reference characters, and their detailed descriptions are omitted here.

Figure 22:
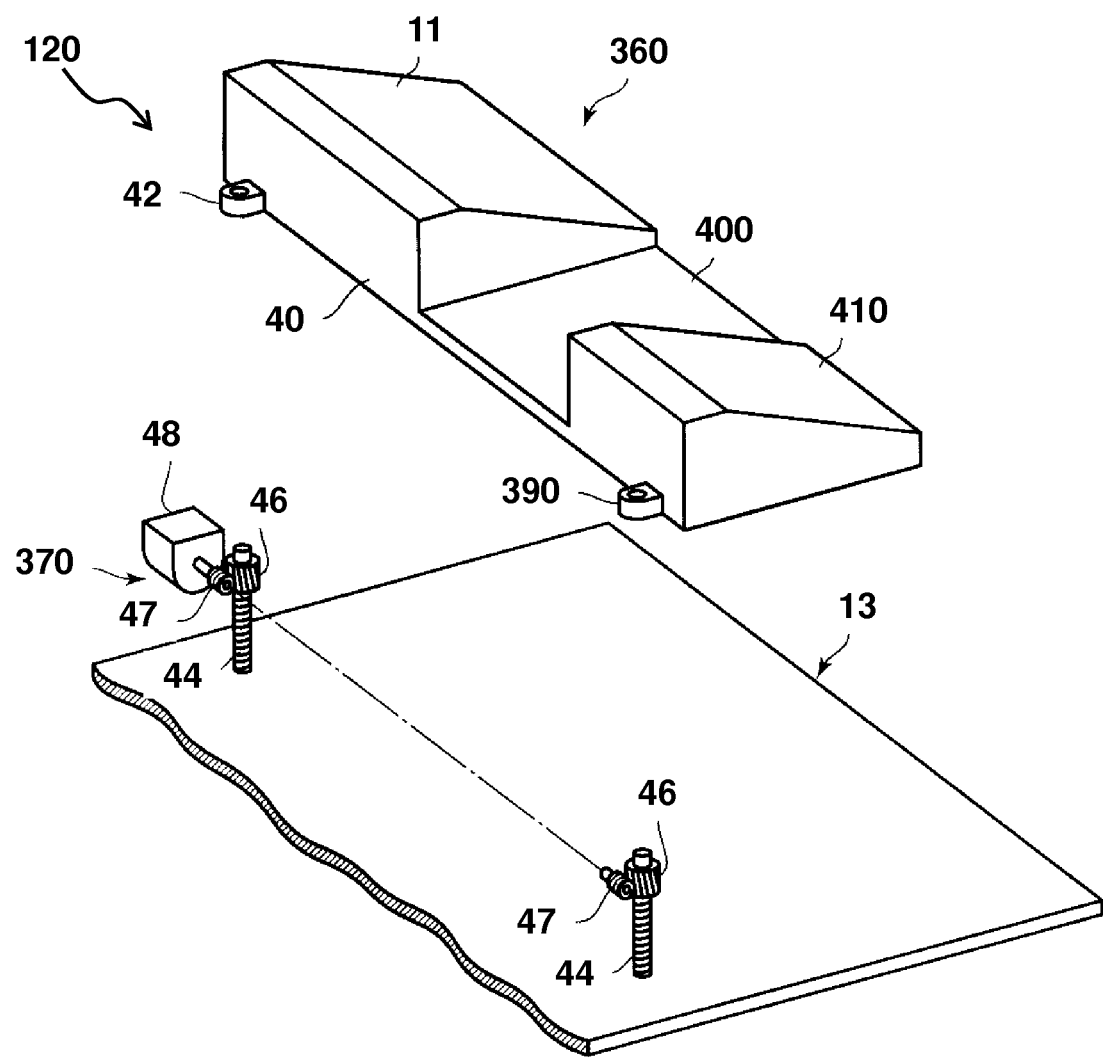
FIG. 22 is an exploded perspective view showing the specific structure of the adjusting device of the heel-placement height and the footrest for the driver's hoot.

In the present embodiment, the heel-placement height adjusting device 120 comprises, as shown in FIG. 22, a movable floor portion 360 and a drive portion 370 which drives the movable floor portion 360 for moving up or down of the movable floor portion 360. The movable floor portion 360 is configured to extend further toward the center of the vehicle, compared with the movable floor portion 36 of the above-described first embodiment shown in FIG. 4, and additionally and integrally comprises a recess portion 400 which is positioned behind the clutch pedal 6 at a central portion thereof and an incline-face portion 410 which is positioned behind the footrest 700 at a left-side portion thereof. This recess portion 400 is properly formed so as to allow the driver to operate (press) the clutch pedal 6 smoothly with the driver's left foot without any interference of the heel of the driver's hoot with the movable floor portion 360. Meanwhile, the incline-face portion 410 functions as part of the footrest adjusting device 100 which adjusts a rest state of the driver's hoot by the footrest 700.

The drive portion 370 has a structure to move up or down the movable floor portion 360, which is similar to the structure of the drive portion 37 of the above-described first embodiment, but a projection 390 which is formed to project from the front-face plate 40 has a screw hole like the projection 42 formed on the right side, and an additionally-provided screw shaft 44 engages with this screw hole. Thus, the movable floor portion 360 which comprises the right-side incline-face portion 11 for supporting the heel of the driver's right foot operating the pedals and the left-side incline-face portion 410 for supporting the heel of the driver's left foot rested on the footrest 700 is moved up or down by the drive motor 48 of the drive portion 370.

Figure 21:
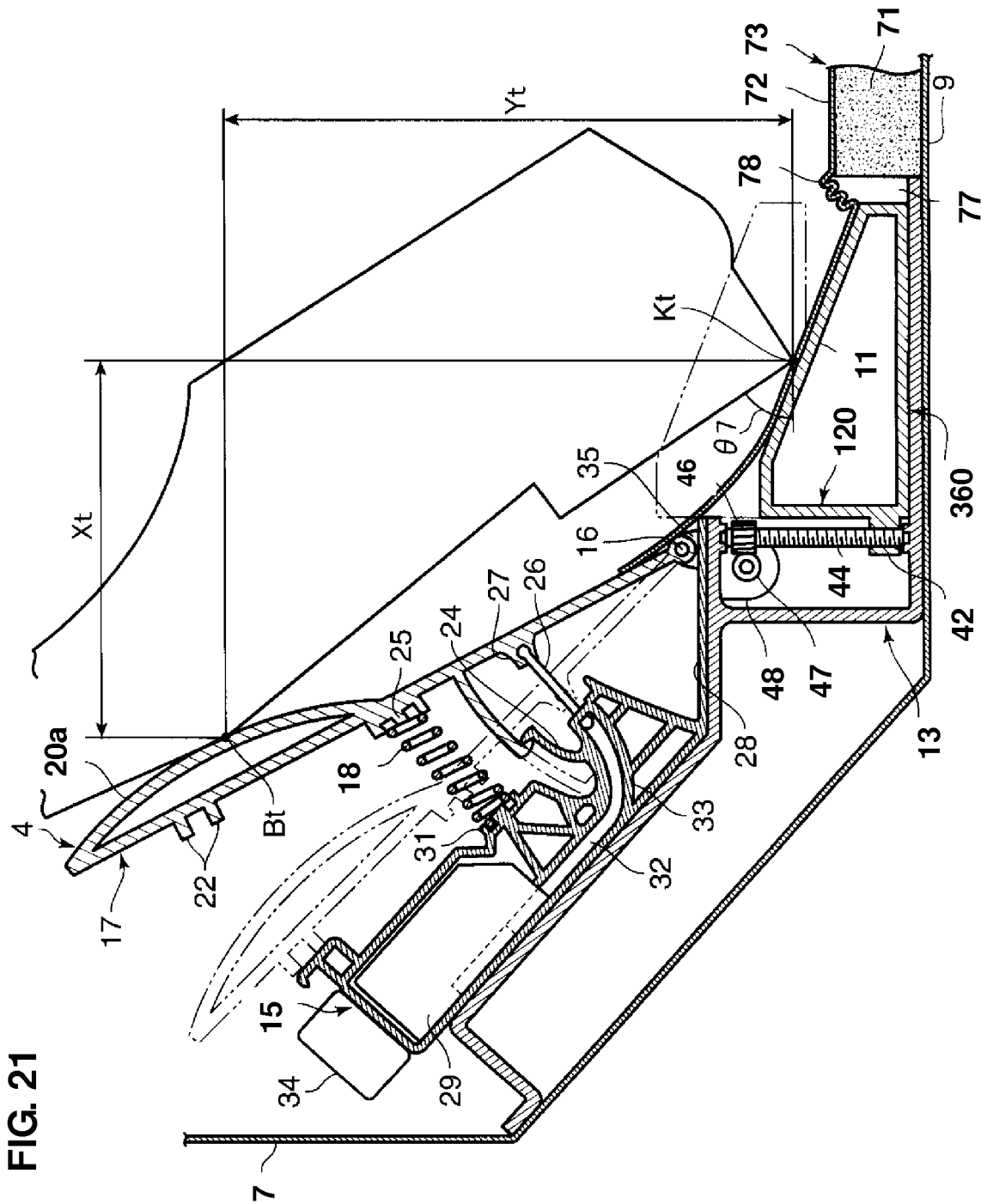
FIG. 21 is a sectional view taken along line III-III of FIG. 20.
Figure 23:
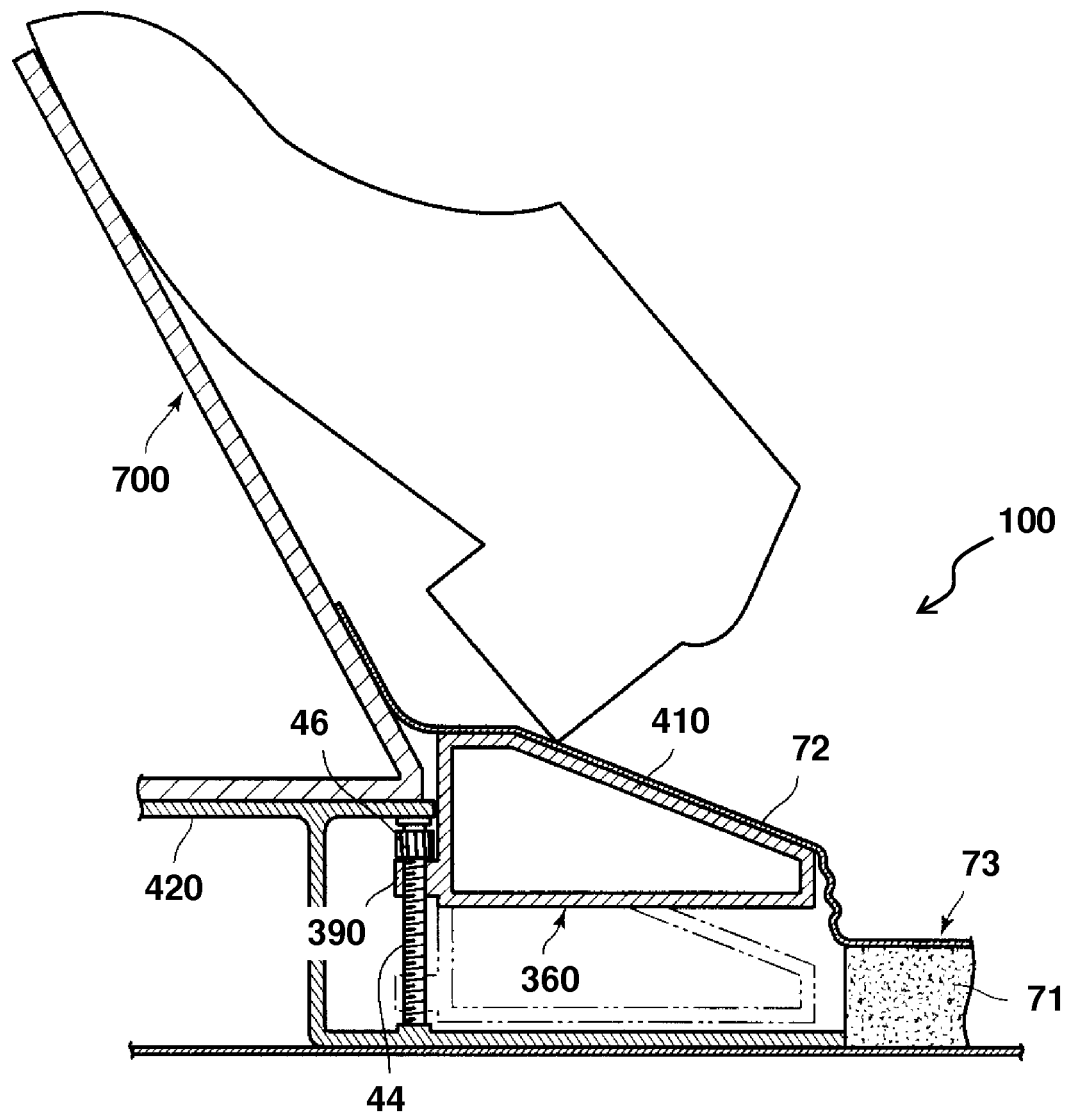
FIG. 23 is a sectional view taken along line VI-VI of FIG. 20.

FIG. 21 is a sectional view taken along line III-III of FIG. 20, which shows a sectional view of the heel-placement height adjusting device 120. FIG. 23 is a sectional view taken along line VI-VI of FIG. 20, which shows a sectional view of the footrest adjusting device 100. As shown in these figures, a floor mat 73, which comprises a back reinforcing material 71 which is mainly made of material having functions of vibration proof, sound insulation, heat insulation and so on, such as melt sheet, felt, or glass wool, and a layer material 72 which covers over an upper face of the reinforcing material 71 and is made of pile material, is arranged on an upper face of the floor panel 9. Further, a notch portion 77 for arranging the support base 13 and the movable floor portion 360 is formed at the reinforcing material 71 of the floor mat 73. The support base 13 of the heel-placement height adjusting device 120 is disposed in this notch portion 77 and fixed onto the floor panel 9. Moreover, the above-described layer material 72 of the floor mat 73 has an expandable portion 78, which is made of bellows, for example, which is expandable according to the moving up or down of the movable floor portion 360 at its rear end portion as shown.

According to the fifth embodiment, the driving position adjusting apparatus further comprises the footrest 700 which is provided beside the operational pedals and the footrest adjusting device 100 which adjusts the position of the footrest 700 according to the adjustment of the heel-placement height adjusting device 120. Thereby, since the position of the driver's foot which is placed on the footrest 700 for not operating the accelerator pedal 4 is adjusted according to the adjustment of the heel-placement height adjusting device 120, an imbalance in the foot angle between the foot operating the accelerator pedal 4 (i.e., the right foot) and the foot not operating the accelerator pedal 4 (i.e., the left foot) can be restrained, so that the driver can be prevented from having uncomfortable feeling.

Figure 24:
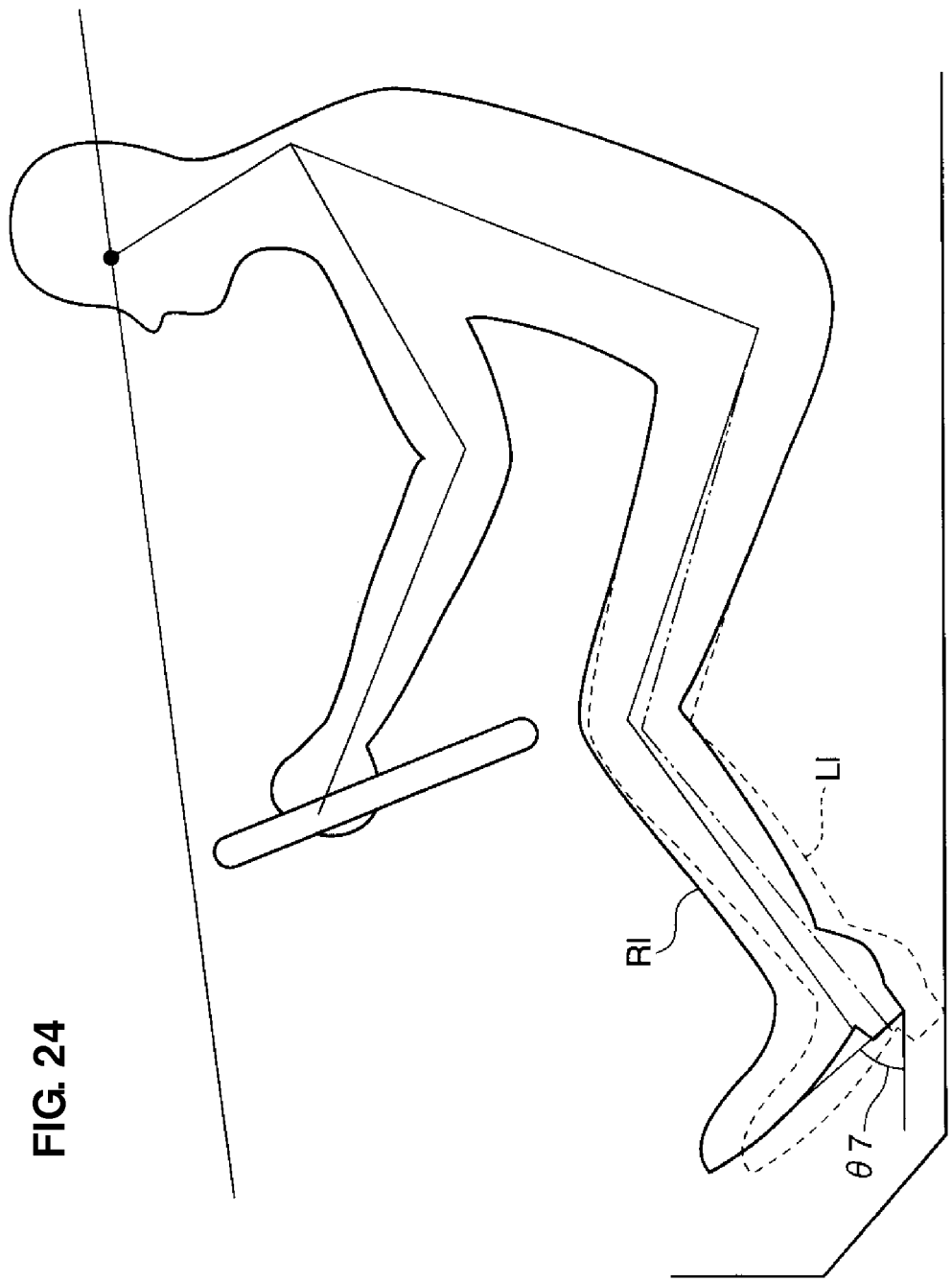
FIG. 24 is an explanatory diagram showing a sitting state of the driver.

Herein, the above-described footrest adjusting device 100 adjusts the height position of the driver's heel rested on the footrest 700. Thereby, the height position of the heel placement of the driver's foot (i.e., the left foot) which is placed on the footrest 700 for not operating the accelerator pedal 4 can be adjusted, so that the imbalance in the foot angle between the foot operating the accelerator pedal 4 (i.e., the right foot) and the foot not operating the accelerator pedal 4 (i.e., the left foot) can be restrained. That is, it can be restrained that there occurs any imbalance in the foot angle between the driver's pedal operating foot (right foot) shown by a solid line R1 in FIG. 24 and the driver's not-operating foot (left foot) shown by a broken line L1 in FIG. 24 is restrained, so that the driver can be prevented properly from having uncomfortable feeling.

Moreover, the heel-placement height adjusting device 120 comprises the movable floor portion 360 which is supported on the floor panel 9 so as to move up or down and the drive portion 370 which drives the movable floor portion 360, and the footrest adjusting device 100 is comprised of part of the above-described movable floor portion 360 and drive portion 370 of the heel-placement height adjusting device 120 (that is, the left-side part of the heel-placement height adjusting device 120 as shown in FIGS. 20 and 22) Thereby, the adjustment of the heel placement of the driver's foot operating the accelerator pedal 4 (i.e., the right foot) and the adjustment of the position of the driver's foot not operating the accelerator pedal 4 (i.e., the left foot) can be conducted concurrently.

Embodiment 6

Figure 25:
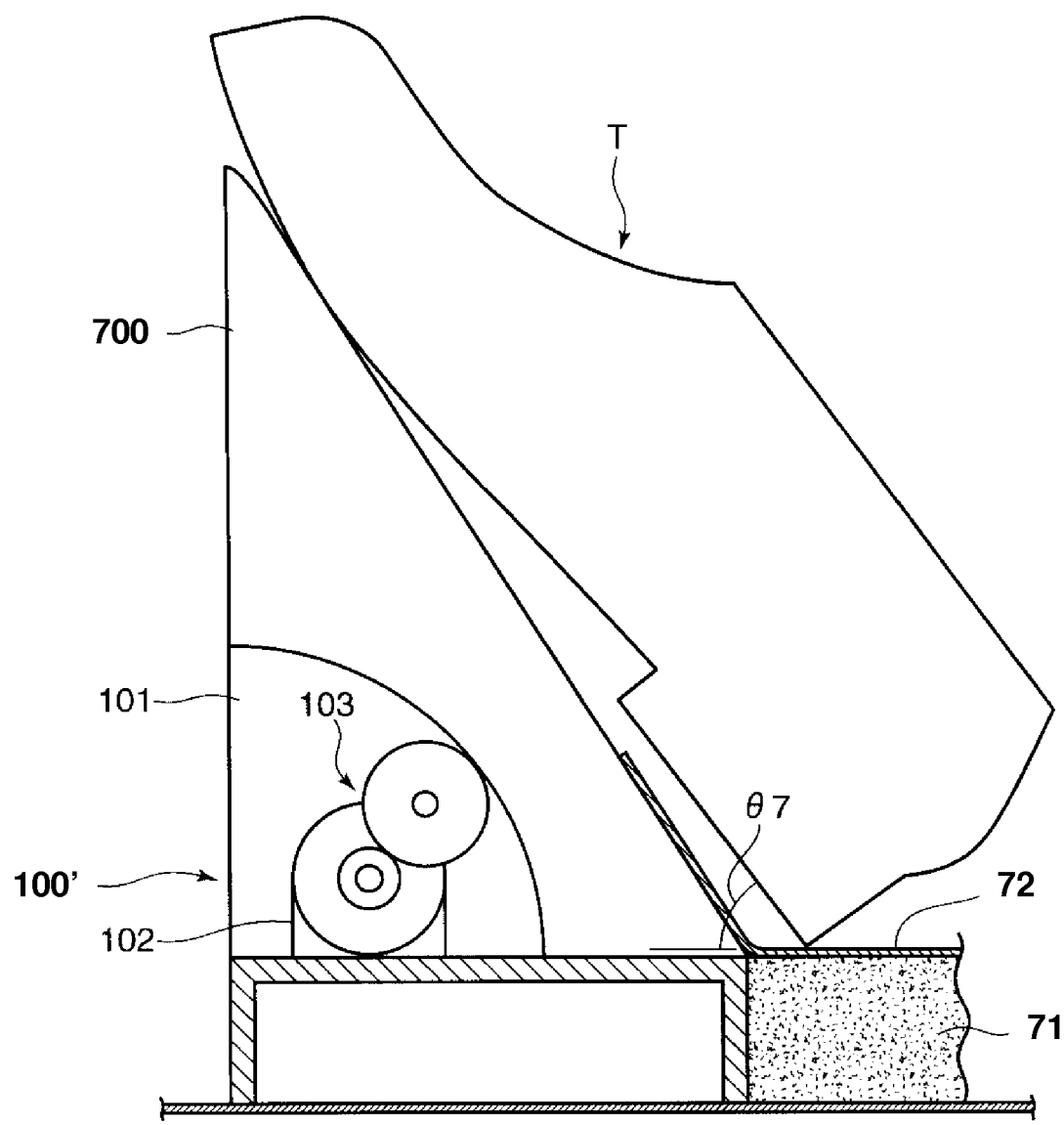
FIG. 25 is a side sectional view showing a sixth embodiment of the driving position adjusting apparatus for a vehicle according to the present invention.
Figure 26:
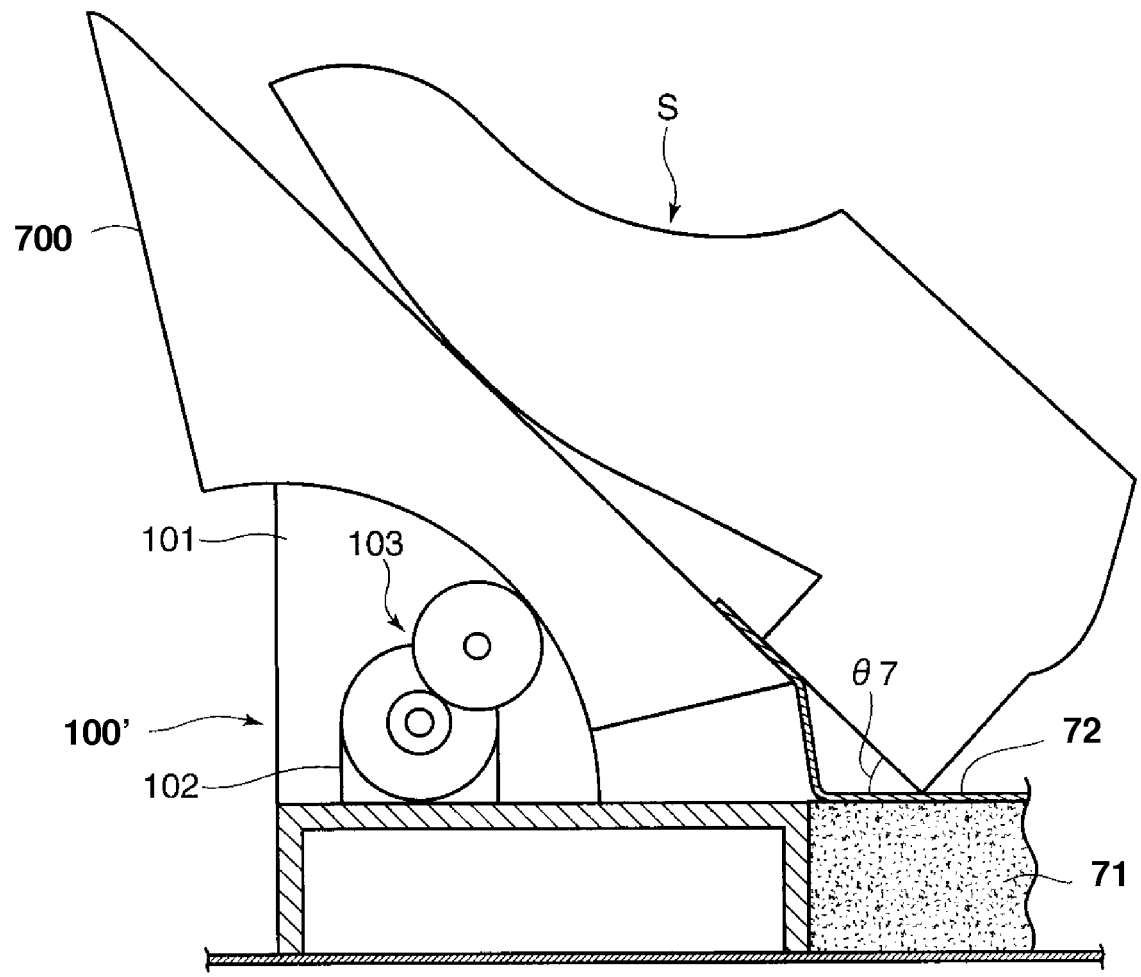
FIG. 26 is a side sectional view showing a state in which the footrest is inclined forwardly, which corresponds to FIG. 25.

FIGS. 25 through 26 show a sixth embodiment of the driving position adjusting apparatus of the present invention. The sixth embodiment shows a modified example of the above-described fifth embodiment.

That is, according to the sixth embodiment, there is provided a footrest adjusting device 100' which adjusts an arrangement angle of the footrest 700, which is arranged on the floor panel 9 separately from the heel-placement height adjusting device described above. This footrest adjusting device 100' comprises a support portion 101 which has an arc-shaped support face to support the footrest 700 rotatably, and a rotational drive portion which comprises a drive motor 102 and a drive gear mechanism 103 and drives the footrest 700 so as to rotate along the support portion 101.

According to the sixth embodiment, since the footrest adjusting device 100' adjusts the arrangement angle of the footrest 700, the sole angle θ7 of the driver's foot which is placed on the footrest 700 can be adjusted, so that the imbalance in the foot angle between the foot operating the accelerator pedal 4 (i.e., the right foot) and the foot not operating the accelerator pedal 4 (i.e., the left foot) can be restrained.

Further, according to the sixth embodiment, the footrest adjusting device 100' is arranged on the floor panel 9 separately from the heel-placement height adjusting device. Thereby, the size of the movable floor portion of the heel-placement height adjusting device can be prevented from becoming improperly large, so that the structure can be properly compact.

The present invention should not be limited to the above-descried embodiments, and any other modifications or improvements may be applied within the scope of a sprit of the present invention.

What is claimed is:

1. A driving position adjusting apparatus for a vehicle, comprising:
   a driver's seat provided on a floor panel of a vehicle compartment;
   an operational pedal operated by a driver seated in the driver's seat;
   an incline-face portion provided on the floor panel, on which a heel of the driver operating the operational pedal is placed, the incline-face portion having an upper face which is inclined so that a front portion thereof is located at a higher position than a rear portion thereof; and
   a heel-placement height adjusting device to adjust a height position of the driver's heel placed on the incline-face portion at least by moving up or down the incline-face portion,
   wherein said operational pedal comprises a movable pedal member which is operated by the driver and a pedal base member which pivotally supports the movable pedal member,
   said heel-placement height adjusting device comprises a movable floor portion which is supported at a support base provided on the floor panel so as to move up or down and a drive portion which drives the movable floor portion for moving up or down of the movable floor portion, and
   said pedal base member of the operational pedal is attached to the support base of the heel-placement height adjusting device as a unit, whereby the heel-placement height adjusting device and the operational pedal are assembled to a vehicle body as a unit.

2. The driving position adjusting apparatus for a vehicle of claim 1, wherein said incline-face portion is arranged on an upper face of said movable floor portion of the heel-placement height adjusting device.

3. The driving position adjusting apparatus for a vehicle of claim 2, wherein a longitudinal length and a longitudinal position of said movable floor portion is set based on a foremost position and a rearmost position of the driver's heel which is changeable depending on a body size and a sitting position of the driver seated in the driver's seat.

4. The driving position adjusting apparatus for a vehicle of claim 1, wherein said operational pedal is an accelerator pedal to control a vehicle traveling drive source.

5. The driving position adjusting apparatus for a vehicle of claim 4, wherein a lower end portion of the movable pedal member is pivotally supported at the pedal base member.

6. A driving position adjusting apparatus for a vehicle, comprising:
   a driver's seat provided on a floor panel of a vehicle compartment;
   an operational pedal operated by a driver seated in the driver's seat;
   an incline-face portion provided on the floor panel, on which a heel of the driver operating the operational pedal is placed, the incline-face portion having an upper face which is inclined so that a front portion thereof is located at a higher position than a rear portion thereof; and
   a heel-placement height adjusting device to adjust a height position of the driver's heel placed on the incline-face portion at least by moving up or down the incline-face portion,
   wherein said operational pedal comprises a movable pedal member which is operated by the driver and a pedal base member which pivotally supports the movable pedal member,
   said heel-placement height adjusting device comprises a movable floor portion which is supported at a support base provided on the floor panel so as to move up or down and a drive portion which drives the movable floor portion for moving up or down of the movable floor portion, and
   said pedal base member of the operational pedal and said support base of the heel-placement height adjusting device are formed as a unit, whereby the heel-placement height adjusting device and the operational pedal are assembled to a vehicle body as a unit.

* * * * *